US012627854B2

(12) United States Patent
Zerr et al.

(10) Patent No.: US 12,627,854 B2
(45) Date of Patent: May 12, 2026

(54) METHODS AND SYSTEMS FOR ENABLING COMMUNICATIONS BETWEEN DEVICES

(71) Applicant: Sonifi Solutions, Inc., Sioux Falls, SD (US)

(72) Inventors: Derin Michael Zerr, Kahului, HI (US); Joel Walter Zdepski, Mountain View, CA (US); Shaun Eugene Marko, Oak Park, IL (US); Chad J. Schroeder, Sioux Falls, SD (US); Andy Loren Anderson, Sioux Falls, SD (US); Christopher Paul Wollmann, Sioux Falls, SD (US)

(73) Assignee: Sonifi Solutions, Inc., Sioux Falls, SD (US)

( * ) Notice: Subject to any disclaimer, the term of this patent is extended or adjusted under 35 U.S.C. 154(b) by 0 days.

(21) Appl. No.: 18/815,450

(22) Filed: Aug. 26, 2024

(65) Prior Publication Data

US 2024/0422383 A1     Dec. 19, 2024

Related U.S. Application Data

(63) Continuation of application No. 18/309,499, filed on Apr. 28, 2023, now Pat. No. 12,101,527, which is a (Continued)

(51) Int. Cl.
*H04N 21/4363* (2011.01)
*H04L 9/40* (2022.01)
(Continued)

(52) U.S. Cl.
CPC ... *H04N 21/43637* (2013.01); *H04L 63/0457* (2013.01); *H04L 67/54* (2022.05);
(Continued)

(58) Field of Classification Search
CPC ......... H04N 21/43637; H04N 21/2143; H04N 21/4126; H04N 21/43615; H04N 21/44;
(Continued)

(56) References Cited

U.S. PATENT DOCUMENTS 4,198,870 A     4/1980  Barker et al.
4,564,732 A     1/1986  Lancaster et al.
(Continued)

FOREIGN PATENT DOCUMENTS

CA     2707202     12/2010
CA     2788573     11/2012
(Continued)

OTHER PUBLICATIONS

"Commercial Requirements for Companion Screen in the DVB-GEM Specification," DVB Organization, Apr. 2013, Version R 6.9.1, 40 pages.
(Continued)

*Primary Examiner* — Alazar Tilahun
(74) *Attorney, Agent, or Firm* — Sheridan Ross P.C.

(57)     ABSTRACT

Methods and systems for selecting and delivering content are provided. More particularly, content can be delivered to an output device from a user device through a device adaptor, such as an over-the-top (OTT) device. The OTT device or devices available to the user device are determined by a communication server. In particular, the OTT device or devices available to the user device are limited to those OTT devices associated with an output device in the user's room, or that the user is otherwise authorized to access.

20 Claims, 19 Drawing Sheets

Related U.S. Application Data continuation of application No. 17/710,453, filed on Mar. 31, 2022, now Pat. No. 11,671,651, which is a continuation of application No. 16/828,660, filed on Mar. 24, 2020, now Pat. No. 11,330,326, which is a continuation of application No. 15/282,556, filed on Sep. 30, 2016, now Pat. No. 10,631,042.

(60) Provisional application No. 62/308,442, filed on Mar. 15, 2016, provisional application No. 62/245,146, filed on Oct. 22, 2015, provisional application No. 62/235,112, filed on Sep. 30, 2015.

(51) Int. Cl.

| | |
|---|---|
| H04L 67/54 | (2022.01) |
| H04N 21/214 | (2011.01) |
| H04N 21/41 | (2011.01) |
| H04N 21/436 | (2011.01) |
| H04N 21/44 | (2011.01) |
| H04N 21/4627 | (2011.01) |
| H04N 21/6583 | (2011.01) |
| H04N 21/81 | (2011.01) |
| H04W 8/00 | (2009.01) |
| H04W 48/18 | (2009.01) |
| H04W 76/11 | (2018.01) |
| H04W 76/16 | (2018.01) |
| H04W 84/12 | (2009.01) |

(52) U.S. Cl.
CPC ..... *H04N 21/2143* (2013.01); *H04N 21/4126* (2013.01); *H04N 21/43615* (2013.01); *H04N 21/44* (2013.01); *H04N 21/4627* (2013.01); *H04N 21/6583* (2013.01); *H04N 21/8186* (2013.01); *H04W 8/005* (2013.01); *H04W 48/18* (2013.01); *H04W 76/11* (2018.02); *H04W 76/16* (2018.02); *H04L 2463/101* (2013.01); *H04W 84/12* (2013.01)

(58) Field of Classification Search
CPC ........... H04N 21/4627; H04N 21/6583; H04N 21/8186; H04N 21/4753; H04N 21/25875; H04N 21/41407; H04N 21/47217; H04N 21/2387; H04N 21/64707; H04N 21/44227; H04N 21/242; H04N 21/437; H04L 63/0457; H04L 67/54; H04L 2463/101; H04W 8/005; H04W 48/18; H04W 76/11; H04W 76/16; H04W 84/12
See application file for complete search history.

(56) References Cited

U.S. PATENT DOCUMENTS

| | | | |
|---|---|---|---|
| 5,374,952 | A | 12/1994 | Flohr |
| 5,455,619 | A | 10/1995 | Truckenmiller et al. |
| 5,506,572 | A | 4/1996 | Hills et al. |
| 5,641,319 | A | 6/1997 | Stoel et al. |
| 5,675,828 | A | 10/1997 | Stoel et al. |
| 5,905,942 | A | 5/1999 | Stoel et al. |
| 5,907,715 | A | 5/1999 | Stoel et al. |
| 5,990,885 | A | 11/1999 | Gopinath |
| 6,226,677 | B1 | 5/2001 | Slemmer |
| 6,240,533 | B1 | 5/2001 | Slemmer |
| 6,343,315 | B1 | 1/2002 | Stoel et al. |
| 6,377,990 | B1 | 4/2002 | Slemmer et al. |
| 6,594,692 | B1 | 7/2003 | Reisman |
| 7,251,329 | B2 | 7/2007 | Ikonen et al. |
| 7,272,844 | B1 | 9/2007 | Bankers et al. |
| 7,380,031 | B2 | 5/2008 | Jones et al. |
| 7,444,663 | B2 | 10/2008 | Fenwick, Jr. et al. |
| 7,895,630 | B2 | 2/2011 | McKenna et al. |
| 7,930,721 | B1 | 4/2011 | Hernes |
| 7,971,782 | B1 | 7/2011 | Shams |
| 8,116,287 | B2 | 2/2012 | Krantz et al. |
| 8,214,429 | B2 | 7/2012 | Chidel et al. |
| 8,250,612 | B2 | 8/2012 | Kim et al. |
| 8,272,561 | B2 | 9/2012 | Shin et al. |
| 8,356,251 | B2 | 1/2013 | Strober |
| 8,370,879 | B2 | 2/2013 | Zerr et al. |
| 8,374,127 | B2 | 2/2013 | Woo et al. |
| 8,434,111 | B2 | 4/2013 | Levy et al. |
| 8,490,127 | B2 | 7/2013 | Vantalon et al. |
| 8,539,524 | B2 | 9/2013 | Woo et al. |
| 8,572,662 | B2 | 10/2013 | Cassidy et al. |
| 8,578,418 | B2 | 11/2013 | Levy et al. |
| 8,655,345 | B2 | 2/2014 | Gold |
| 8,713,612 | B2 | 4/2014 | Levy et al. |
| 8,732,753 | B2 | 5/2014 | Warrick |
| 8,854,195 | B2 | 10/2014 | West et al. |
| 8,855,622 | B2 | 10/2014 | Gold |
| 8,903,978 | B2 | 12/2014 | Zerr et al. |
| 9,003,455 | B2 | 4/2015 | Hulse et al. |
| 9,032,451 | B2 | 5/2015 | Cansino et al. |
| 9,060,011 | B2 | 6/2015 | Gold |
| 9,060,197 | B2 | 6/2015 | Warrick et al. |
| 9,107,055 | B2 | 8/2015 | Zerr et al. |
| 9,326,095 | B2 | 4/2016 | Yu et al. |
| 9,369,829 | B2 | 6/2016 | Zerr et al. |
| 9,532,304 | B1 | 12/2016 | Chen et al. |
| 9,602,864 | B2 | 3/2017 | Cholas et al. |
| 9,648,577 | B1 | 5/2017 | Bradish |
| 9,699,144 | B2 | 7/2017 | Chechani et al. |
| 9,787,756 | B2 | 10/2017 | Gold |
| 9,854,388 | B2 | 12/2017 | Zerr et al. |
| 9,942,304 | B2 | 4/2018 | Gold |
| 9,979,710 | B2 | 5/2018 | Chu et al. |
| 10,244,375 | B2 | 3/2019 | Zerr et al. |
| 10,291,956 | B2 | 5/2019 | Zdepski et al. |
| 10,326,823 | B2 | 6/2019 | Gold |
| 10,327,035 | B2 | 6/2019 | Zerr et al. |
| 10,455,276 | B2 | 10/2019 | Guerra |
| 10,594,552 | B2 | 3/2020 | Schallich et al. |
| 10,602,212 | B2 | 3/2020 | Zerr et al. |
| 10,631,042 | B2 | 4/2020 | Zerr et al. |
| 10,681,142 | B2 | 6/2020 | Ong et al. |
| 10,743,075 | B2 | 8/2020 | Zerr et al. |
| 11,039,189 | B2 | 6/2021 | Servignat et al. |
| 11,122,318 | B2 | 9/2021 | Zerr et al. |
| 11,330,326 | B2 | 5/2022 | Zerr et al. |
| 11,641,502 | B2 | 5/2023 | Zerr et al. |
| 11,671,651 | B2 | 6/2023 | Zerr et al. |
| 12,063,406 | B2 | 8/2024 | Zerr et al. |
| 12,101,527 | B2 | 9/2024 | Zerr et al. |
| 2002/0052965 | A1 | 5/2002 | Dowling |
| 2002/0054016 | A1 | 5/2002 | Smith et al. |
| 2002/0133558 | A1 | 9/2002 | Fenno et al. |
| 2003/0071792 | A1 | 4/2003 | Safadi |
| 2003/0090386 | A1 | 5/2003 | Giraldin et al. |
| 2003/0202006 | A1 | 10/2003 | Callway |
| 2003/0229900 | A1 | 12/2003 | Reisman |
| 2004/0261110 | A1 | 12/2004 | Kolbeck et al. |
| 2005/0213439 | A1 | 9/2005 | Johnson |
| 2005/0283791 | A1 | 12/2005 | McCarthy et al. |
| 2006/0107299 | A1 | 5/2006 | Bartfeld et al. |
| 2006/0117379 | A1 | 6/2006 | Bennett et al. |
| 2006/0123053 | A1 | 6/2006 | Scannell, Jr. |
| 2006/0153122 | A1 | 7/2006 | Hinman et al. |
| 2006/0277312 | A1 | 12/2006 | Hirsch |
| 2007/0080934 | A1 | 4/2007 | Chen et al. |
| 2007/0155326 | A1 | 7/2007 | Lin et al. |
| 2007/0157281 | A1 | 7/2007 | Ellis et al. |
| 2008/0060081 | A1 | 3/2008 | Van Den Heuvel |
| 2008/0130595 | A1 | 6/2008 | Abdel-Kader |
| 2008/0141313 | A1 | 6/2008 | Kato et al. |
| 2008/0151847 | A1 | 6/2008 | Abujbara |
| 2008/0168129 | A1 | 7/2008 | Robbin et al. |
| 2008/0207170 | A1 | 8/2008 | Khetawat et al. |
| 2008/0220741 | A1 | 9/2008 | Hung |
| 2009/0007240 | A1 | 1/2009 | Vantalon et al. |

(56) References Cited

U.S. PATENT DOCUMENTS

| | | |
|---|---|---|
| 2009/0083824 A1 | 3/2009 | McCarthy et al. |
| 2009/0102983 A1 | 4/2009 | Malone et al. |
| 2009/0125971 A1 | 5/2009 | Belz et al. |
| 2009/0144815 A1 | 6/2009 | Vrielink et al. |
| 2009/0158404 A1 | 6/2009 | Hahn et al. |
| 2009/0172780 A1 | 7/2009 | Sukeda et al. |
| 2009/0180614 A1 | 7/2009 | Rajagopal et al. |
| 2009/0320055 A1 | 12/2009 | Langille et al. |
| 2010/0058485 A1 | 3/2010 | Gonzalez et al. |
| 2010/0069115 A1 | 3/2010 | Liu |
| 2010/0070997 A1 | 3/2010 | Friedman |
| 2010/0145859 A1 | 6/2010 | Murakami et al. |
| 2010/0162294 A1 | 6/2010 | Yin et al. |
| 2010/0165879 A1 | 7/2010 | Gupta et al. |
| 2010/0176919 A1 | 7/2010 | Myers et al. |
| 2010/0265845 A1 | 10/2010 | Lampen |
| 2010/0278345 A1 | 11/2010 | Alsina et al. |
| 2010/0330979 A1 | 12/2010 | Harris |
| 2011/0099598 A1 | 4/2011 | Shin et al. |
| 2011/0116452 A1 | 5/2011 | Welch et al. |
| 2011/0167486 A1 | 7/2011 | Ayloo et al. |
| 2011/0244829 A1 | 10/2011 | Kase |
| 2011/0290893 A1 | 12/2011 | Steinberg |
| 2011/0295502 A1 | 12/2011 | Faenger |
| 2011/0298596 A1* | 12/2011 | Warrick ............... H04N 21/414 340/12.53 |
| 2011/0302607 A1 | 12/2011 | Warrick et al. |
| 2011/0314497 A1 | 12/2011 | Warrick et al. |
| 2012/0027374 A1 | 2/2012 | Lipkind |
| 2012/0072951 A1 | 3/2012 | King |
| 2012/0075538 A1 | 3/2012 | Okuda |
| 2012/0096503 A1 | 4/2012 | Slothouber et al. |
| 2012/0159472 A1 | 6/2012 | Hong et al. |
| 2012/0159538 A1 | 6/2012 | Phillips et al. |
| 2012/0166628 A1 | 6/2012 | Kullos |
| 2012/0166655 A1 | 6/2012 | Maddali et al. |
| 2012/0243444 A1 | 9/2012 | Hillier et al. |
| 2012/0249890 A1 | 10/2012 | Chardon et al. |
| 2012/0260268 A1 | 10/2012 | Mirkin |
| 2012/0272147 A1 | 10/2012 | Strober |
| 2013/0051237 A1 | 2/2013 | Ong |
| 2013/0081093 A1 | 3/2013 | Cassidy et al. |
| 2013/0091309 A1 | 4/2013 | Bjontegard et al. |
| 2013/0097286 A1 | 4/2013 | Robbin et al. |
| 2013/0124759 A1 | 5/2013 | Strober |
| 2013/0142181 A1 | 6/2013 | Makim et al. |
| 2013/0239199 A1 | 9/2013 | Ong |
| 2013/0297723 A1 | 11/2013 | Iwaniszyn |
| 2013/0298020 A1 | 11/2013 | Stoikos |
| 2013/0305320 A1 | 11/2013 | Warrick et al. |
| 2013/0305341 A1 | 11/2013 | Baker et al. |
| 2013/0339533 A1 | 12/2013 | Neerinex et al. |
| 2013/0339865 A1 | 12/2013 | Oslund et al. |
| 2013/0346564 A1 | 12/2013 | Warrick et al. |
| 2013/0346808 A1 | 12/2013 | Gyorffy |
| 2013/0347028 A1 | 12/2013 | Warrick et al. |
| 2014/0006474 A1 | 1/2014 | White et al. |
| 2014/0026162 A1 | 1/2014 | Cassidy et al. |
| 2014/0045472 A1 | 2/2014 | Sharma et al. |
| 2014/0051362 A1 | 2/2014 | Ding |
| 2014/0053246 A1 | 2/2014 | Huang et al. |
| 2014/0053282 A1 | 2/2014 | Court |
| 2014/0067828 A1 | 3/2014 | Archibong et al. |
| 2014/0089524 A1 | 3/2014 | Carriere |
| 2014/0090030 A1 | 3/2014 | Ong |
| 2014/0114919 A1 | 4/2014 | Woods |
| 2014/0143380 A1 | 5/2014 | Warrick et al. |
| 2014/0150031 A1 | 5/2014 | Kumar et al. |
| 2014/0189758 A1 | 7/2014 | Kozlowski |
| 2014/0189759 A1 | 7/2014 | Warrick et al. |
| 2014/0245395 A1 | 8/2014 | Hulse et al. |
| 2014/0250460 A1 | 9/2014 | Hulse et al. |
| 2014/0250470 A1 | 9/2014 | Warrick |
| 2014/0282751 A1 | 9/2014 | Lee et al. |
| 2014/0282921 A1 | 9/2014 | Filman et al. |
| 2014/0289410 A1 | 9/2014 | Smith et al. |
| 2014/0304722 A1 | 10/2014 | Ostlund |
| 2014/0331135 A1 | 11/2014 | Sukoff et al. |
| 2014/0337950 A1 | 11/2014 | Yang et al. |
| 2014/0347181 A1 | 11/2014 | Luna et al. |
| 2014/0362991 A1 | 12/2014 | Ebrom |
| 2015/0089222 A1 | 3/2015 | White et al. |
| 2015/0139025 A1 | 5/2015 | Lee et al. |
| 2015/0147972 A1 | 5/2015 | Motto |
| 2015/0254726 A1 | 9/2015 | Cassidy et al. |
| 2015/0334245 A1 | 11/2015 | Lin et al. |
| 2015/0339274 A1 | 11/2015 | Pappu et al. |
| 2015/0350690 A1 | 12/2015 | Zerr et al. |
| 2015/0365457 A1 | 12/2015 | Dvir et al. |
| 2015/0365512 A1 | 12/2015 | MacKenzi et al. |
| 2015/0373123 A1 | 12/2015 | Warrick et al. |
| 2015/0373401 A1 | 12/2015 | Kwon et al. |
| 2015/0382195 A1 | 12/2015 | Grim et al. |
| 2016/0027399 A1 | 1/2016 | Wilde et al. |
| 2016/0073440 A1 | 3/2016 | Palten et al. |
| 2016/0192191 A1 | 6/2016 | Lee et al. |
| 2016/0248746 A1 | 8/2016 | James et al. |
| 2016/0249158 A1 | 8/2016 | Tredoux et al. |
| 2016/0255661 A1 | 9/2016 | Siraj et al. |
| 2016/0285877 A1 | 9/2016 | Anderson et al. |
| 2016/0323433 A1 | 11/2016 | Anderson et al. |
| 2017/0041812 A1 | 2/2017 | Luzzolino et al. |
| 2017/0195318 A1 | 7/2017 | Liu et al. |
| 2017/0206593 A1 | 7/2017 | Zolotov |
| 2017/0229009 A1 | 8/2017 | Foster et al. |
| 2018/0121150 A1 | 5/2018 | Lin et al. |
| 2019/0297134 A1 | 9/2019 | Gold |
| 2019/0335225 A1 | 10/2019 | Fang et al. |
| 2020/0037025 A1 | 1/2020 | Zerr et al. |
| 2020/0329278 A1 | 10/2020 | Zerr et al. |

FOREIGN PATENT DOCUMENTS

| | | |
|---|---|---|
| CA | 2790354 | 3/2013 |
| CA | 2817932 | 12/2013 |
| CA | 2820654 | 12/2013 |
| CN | 203590374 | 5/2014 |
| EP | 0094839 | 11/1983 |
| WO | WO 2007/002604 | 1/2007 |
| WO | WO 2009/137247 | 11/2009 |
| WO | WO 2012/145227 | 10/2012 |

OTHER PUBLICATIONS

"DIAL Discovery And Launch protocol specification," Netflix, Inc., 2012, Version 1.6.4, 16 pages.

"DIAL: Discovery And Launch protocol specification," Netflix, Inc., 2014, Version 1.7.2, 30 pages.

"Specification of the Bluetooth® System Version 4.2. Manual," Bluetooth SIG, Inc., Dec. 2014, 40 pages [retrieved on May 21, 2016 from https://www.bluetooth.com/specifications/adopted-specifications].

Erman et al. "Over the Top Video: The Gorilla in the Cellular Networks," IMC11, Nov. 24, 2011 [retrieved from the internet May 9, 2017 from URL: www.cs.columbia.edu/~lierranli/coms6998-7Spring2014/papers/videocellular_imc2011.pdf].

Montpetit et al. "IPTV: An End to End Perspective," Journal of Communications, May 2010, vol. 5, No. 5, pp. 358-373.

Xia et al. "A Survey on Software-Defined Networking," IEEE Communication Surveys & Tutorials, First Quarter 2015, vol. 17, No. 1, pp. 27-51.

International Search Report and Written Opinion for International (PCT) Patent Application No. PCT/US16/54987, mailed Feb. 21, 2017, 12 pages.

International Preliminary Report on Patentability for International (PCT) Patent Application No. PCT/US2016/054897, dated Apr. 12, 2018 9 pages.

Official Action for Canada Patent Application No. 2,999,892, dated Nov. 18, 2022 3 pages.

Official Action for Canada Patent Application No. 2,999,892, dated Jul. 14, 2023 3 pages.

(56)            References Cited

OTHER PUBLICATIONS

Notice of Allowance for Canada Patent Application No. 2,999,892, dated Mar. 14, 2024 1 page.
Extended Search Report for European Patent Application No. 16852750.5, dated Nov. 19, 2018 11 pages.
Official Action for European Patent Application No. 16852750.5, dated May 10, 2021 5 pages.
Intention to Grant for European Patent Application No. 16852750.5, dated Feb. 5, 2024 61 pages.
International Search Report and Written Opinion for International (PCT) Patent Application No. PCT/US16/54876, mailed Dec. 29, 2016, 8 pages.
International Preliminary Report on Patentability for International (PCT) Patent Application No. PCT/US2016/054876, dated Apr. 12, 2018 7 pages.
Official Action for U.S. Appl. No. 15/282,556, mailed Jul. 24, 2017, 20 pages.
Official Action for U.S. Appl. No. 15/282,556, dated Feb. 7, 2018 20 pages.
Official Action for U.S. Appl. No. 15/282,556, dated Aug. 1, 2018 21 pages.
Official Action for U.S. Appl. No. 15/282,556, dated Jan. 14, 2019 21 pages.
Official Action for U.S. Appl. No. 15/282,556, dated Jun. 6, 2019 20 pages.
Official Action for U.S. Appl. No. 15/282,556, dated Dec. 10, 2019.
Official Action for U.S. Appl. No. 15/282,676, dated Mar. 9, 2018 20 pages.
Official Action for U.S. Appl. No. 15/282,676, dated Jul. 20, 2018 32 pages.
Notice of Allowance for U.S. Appl. No. 15/282,676, dated Jan. 8, 2019 13 pages.
Notice of Allowance for U.S. Appl. No. 16/828,660, dated Jan. 7, 2022 10 pages.
Official Action for U.S. Appl. No. 17/710,453, dated Sep. 29, 2022 7 pages.
Notice of Allowance for U.S. Appl. No. 17/710,453, dated Jan. 31, 2023 8 pages.
Official Action for U.S. Appl. No. 18/309,499, dated Nov. 24, 2023 7 pages.
Notice of Allowance for U.S. Appl. No. 18/309,499, dated May 31, 2024 8 pages.

* cited by examiner

METHODS AND SYSTEMS FOR ENABLING COMMUNICATIONS BETWEEN DEVICES

CROSS-REFERENCE TO RELATED APPLICATIONS

This application is a continuation of U.S. patent application Ser. No. 18/309,499, filed Apr. 28, 2023, which is a continuation of U.S. patent application Ser. No. 17/710,453, filed Mar. 31, 2022, now U.S. Pat. No. 11,671,651, which is a continuation of U.S. patent application Ser. No. 16/828, 660, filed Mar. 24, 2020, now U.S. Pat. No. 11,330,326, which is a continuation of U.S. patent application Ser. No. 15/282,556, filed Sep. 30, 2016, now U.S. Pat. No. 10,631, 042, which claimed the benefit of U.S. Provisional Patent Application Ser. No. 62/235,112, filed Sep. 30, 2015, U.S. Provisional Patent Application Ser. No. 62/245,146, filed Oct. 22, 2015, and U.S. Provisional Patent Application Ser. No. 62/308,442, filed Mar. 15, 2016, the entire disclosures of each of which are hereby incorporated herein by reference in their entirety.

FIELD

Systems and methods for delivering content to an output device are provided.

BACKGROUND

Increasingly, video entertainment, such as movies and television shows, is delivered to users on demand over digital networks. In addition, the distribution of content has expanded to include user devices, such as smart phones. These user devices have the ability to interface with content delivery systems and to output video and other content to users. User devices are also increasingly used as a store of credentials. However, because of the need for mobility, the output capabilities of user devices are necessarily limited. Therefore, it is desirable to direct content streams associated with a user device to televisions or home theater systems.

Systems and methods currently available include those that involve establishing a dedicated connection between a user device and an output device. These can be through wireline or wireless connections. However, such dedicated connections can be limited by controls put in place by digital rights management systems. Also, such arrangements rely on the user device's connection to the content provider. Accordingly, bandwidth limitations and high usage costs are significant limitations. In addition, where multiple output devices are potentially available in the vicinity of the user device, selecting and using an appropriate output device can become problematic, particularly in a hotel or other hospitality or Multiple Dwelling Unit setting.

In many hospitality settings, device isolation, which prevents user devices from discovering other devices, is a requirement. In particular, Wi-Fi clients are restricted from seeing other Wi-Fi devices. The requirement of device isolation thus conflicts with the desire to allow a user device to discover and make use of other Wi-Fi devices in the vicinity of the user device. In addition, previous systems have lacked a way to connect devices on different sub-networks or nodes.

SUMMARY

Embodiments of the present disclosure are directed to systems and methods for delivering content to an output device selected from a constrained or controlled set of output devices. In accordance with embodiments of the current disclosure, an exemplary system includes a communication server that operates as a proxy device. The communication server can provide functions that enable a user device to operably connect to a communication system. After a connection is established, the user can operate the user device to control an output device, send data, including, but not limited to data streams to the output device, or to perform other functions. Alternatively or in addition, the communication server can present a constrained set of output devices or associated over-the-top (OTT) devices to the user device that the user can make a selection from to operably connect to an output device. The constrained set of output devices can include one or more output devices, and can be those output devices associated with a user's room. The communication server can further provide at least one virtual client. The virtual client allows a selected output device to receive content from or on behalf of the user device. Embodiments of the present disclosure also control the output devices that are indicated as being available to the user device. Where content is received by the virtual client on behalf of the user device, that content can be delivered from the virtual client to the output device, without passing through the user device. In addition, the user device can remain operable with respect to command and control operations involving the content.

In accordance with embodiments of the present disclosure, the communication server can provide multiple virtual clients that can each be assigned to a different user device. The communication server can be connected to one or more user devices via a first network. For a particular user device or client, the assigned virtual client can operate to receive content from a source of content, such as a content provider, connected to the virtual client. Moreover, the virtual client can be connected to the source of content by a second network. In accordance with embodiments of the present disclosure, multiple user devices on a first network or sub-network can each be operatively connected to an assigned virtual client instance and to an assigned output device. As an example, but without limitation, the first network can include a wireless network provided as part of a local area network and the second network can include the Internet and/or an intranet.

Connections between virtual clients and output devices can be established over a content distribution network. In addition, the proxy device can handle digital rights management (DRM) for received content and route that content to an appropriate output device. The term DRM Bridge is used herein to denote the function of receiving content in a first security domain and translating the content rights to a new security domain corresponding to the output device chosen. This transformation may include one or more of the following: reformatting metadata and rights, re-encrypting content entitlements, re-scrambling the compressed content stream, decoding and re-encoding the content stream to change formats.

In accordance with at least some embodiments of the present disclosure, the proxy device can comprise a communication server that is associated with a local content distribution network, a cloud-based server connected to the local content distribution network via the Internet, a server located at a hospitality facility, or an in-room device. Moreover, the local content distribution network can include a content distribution device, such as an edge quadrature amplitude modulation (QAM) modulator that can be interconnected to a plurality of output devices, a set-top box, smart TV, an interface device associated with a single TV, or some other device associated with a single output device. The local content distribution network can also include one or more of an Ethernet network, a coaxial distribution network, an optical fiber network, a wireless network, a Wi-Fi network, and/or a high definition multimedia interface (HDMI) connection.

Methods in accordance with embodiments of the present disclosure include supplying a communication server or proxy device operable to provide a plurality of virtual devices or virtual player sessions. Each of the virtual devices can be assigned to a user device on an ad hoc basis. In addition, a virtual device can be associated with a source of content based on credentials provided by the user device. For example, during a seek or initialization operation, a client or user device can discover an available output device and/or virtual device. In response to a user command, one of the available output devices and/or virtual devices can be associated with the user device. Where multiple output devices and/or virtual devices are available on one network, the output devices and/or virtual devices available for selection by a user of a particular user device can be limited according to various constraints. For example, in a hospitality setting, only those output devices within the room of the user are available for selection by the user. In addition, after association of a user device with a virtual device and an output device, command and control input can still be operatively received by that user device. For instance, in response to command and control input from a user entered at the user device, the delivery of content to and the output of that content from an output device can be controlled.

Additional advantages and features of embodiments of the present disclosure will become more readily apparent from the following description, particularly when considered together with the accompanying drawings.

DETAILED DESCRIPTION

Figure 1:
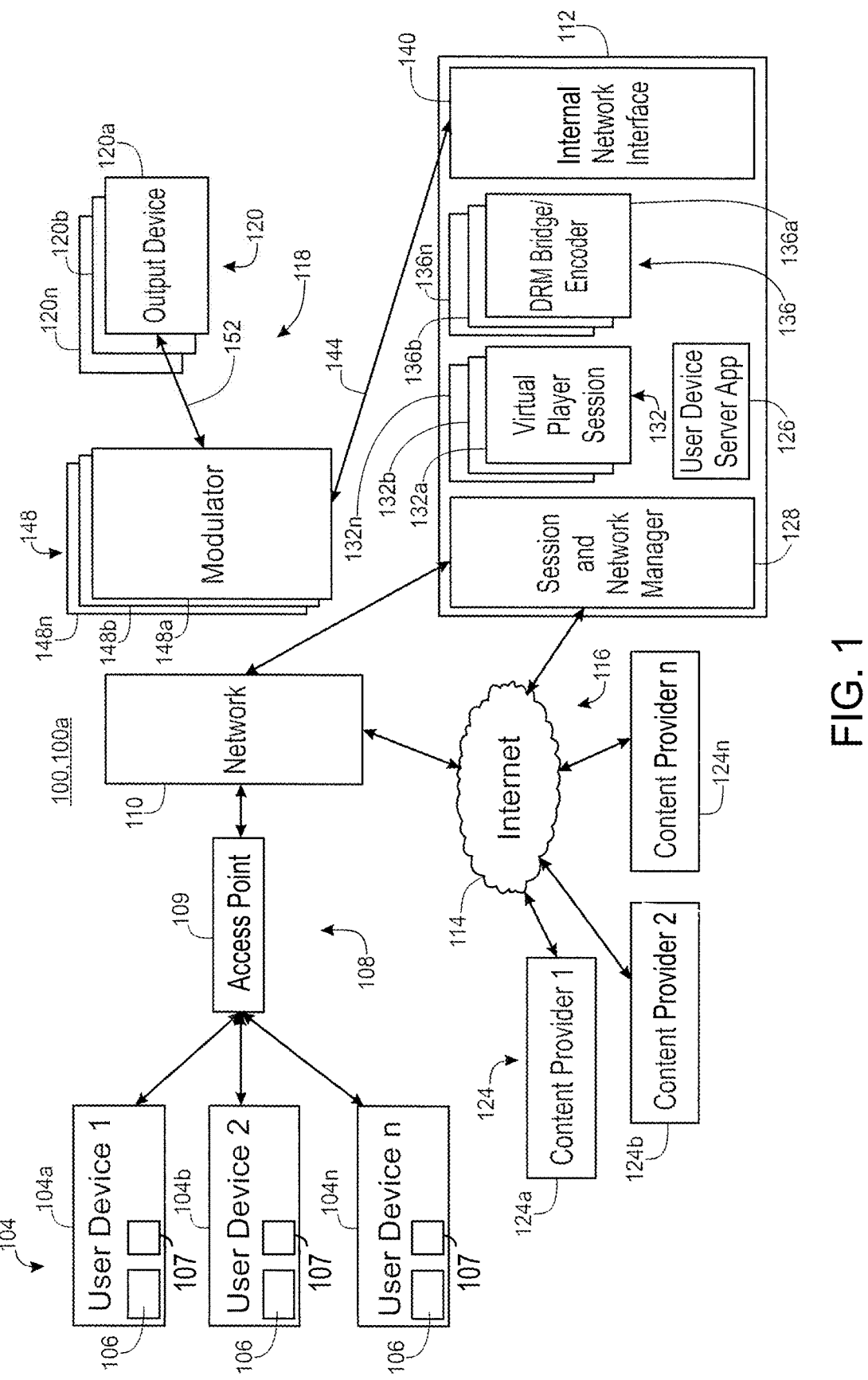
FIG. 1 depicts a system for selecting and delivering content in accordance with embodiments of the present disclosure.

FIG. 1 illustrates a system in accordance with embodiments of the present disclosure for selecting and delivering content 100 and in particular a system 100a that enables a user device 104 to be selectively connected to an output device 120. In general, the system 100a includes one or more user devices 104, a first network 108, a communication server or network controller server 112, a second network 116, a third or facility infrastructure network 118, such as on-site content distribution network, and one or more output devices 120.

In accordance with at least some embodiments of the present disclosure, a user device 104 may comprise a mobile device. Examples of user devices 104 include, but are not limited to, smart phones, tablets, laptops, or any other devices that are capable of supporting the presentation of credentials to and communications with one or more content providers 124 or other entities or nodes on a network. A user device 104 may additionally be capable of supporting the selection of content available from a content provider 124. For example, the user device 104 may access content using a web browser, through execution of a content provider app 106, and/or the receipt of user input. Accordingly, a user device 104 can include memory to store application programming, user data and credentials, and other information, a processor for executing the application programming, a user input, a user output, and a communication interface for supporting the delivery and receipt of data and instructions to and from a network or networks, such as the first network 108. Typically, but not necessarily, a user device 104 is associated with a particular person.

The content provider app 106 or other application that can be operated to access content may comprise an application, Internet browser plug-in, or other programming that enables or facilitates obtaining content from a content provider 124. In a typical implementation, a content provider app 106 may be operative only with a particular content provider 124. In addition to providing a user interface, the content provider app 106 may store credentials needed to access content from the associated content provider 124. Multiple content provider apps 106 may be associated with a single user device 104.

The first network 108 may comprise a local area network or a wide area network. The first network 108 may further comprise a relatively low bandwidth or low speed network. An example of a local area network is a network associated with a hotel or other hospitality facility and can include a Wi-Fi network, a wired Ethernet network, or any other network technology. In general, the first network 108 is operable to support communications between at least a user device 104 and the communication server 112. The first network 108 can also be operable to support communications between a user device 104 and a content provider 124, for example via the Internet 114. In accordance with at least some embodiments of the present invention, the first network 108 includes one or more access points 109 and other network devices 110, including, but not limited to, network media, switches, routers, and/or firewalls.

The communication server 112 may comprise a communications server located at or in the vicinity of the site at which a user device 104 and an output device 120 are located. Moreover, the communication server 112 can be directly connected to the first network 108 and the on-site content distribution network 118. Alternatively, the communication server 112 may be placed at a location that is remote from the user device 104 and the output device 120. In the system 100a illustrated in FIG. 1, the communication server 112 is an on-site server. In accordance with at least some embodiments of the present disclosure, the communication server 112 can include a user device server application 126. The user device server application 126 can respond to requests for pairing codes and/or otherwise authorize a user device 104 to access communication server 112 services. In accordance with other embodiments, the user device server application 126 functions may be implemented by another network node (e.g., another system server) or its function can be implemented across a number of different network nodes. In at least some embodiments, the user device server application 126 may establish pairing relationships between a user device 104 and an output device 120.

In accordance with embodiments of the present disclosure, the communication server 112 provides session and network manager 128 services. The functions of the session and network manager 128 can include responding to requests from a user device 104 to pair with an output device 120 in connection with the delivery of content. In other embodiments, the session and network manager 128 can register the user device 104 with the communication server 112, the local content distribution network 118, and/or a specific output device 120. Accordingly, the session and network manager 128 can create and manage lists of user devices 104 that are paired or otherwise registered with the system 100, output devices 120 included on or as part of a facility's premises, the visibility of output devices 120 to the user devices 104, and active connections between user devices 104 and output devices 120. Alternatively, registration may be performed by an administrative server that is separate from the communication server 112. The session and network manager services 128 can also implement a virtual discovery and launch (DIAL) server, can route network traffic on behalf of a user device 104 from a content provider 124 to an output device 120, can route control inputs entered at a user device 104 to a virtual player 132, and can route selection and control inputs entered at a user device 104 to a content provider 124, as described in further detail elsewhere herein. The DIAL protocol can facilitate an operable connection between a mobile device and an output device. However, the DIAL protocol has been limited to connections between devices on the same sub-network. In addition, implementations of the DIAL protocol have routed content from the user device 104 to the output device 120. As can be appreciated by one of skill in the art after consideration of the present disclosure, embodiments of the present disclosure allow devices or nodes, such as user devices 104 and output devices 120, on different networks and/or sub-networks to be operatively connected to one another and also allow content to be routed from a content provider 124 to an output device 120 in response to a request made through a user device 104 and/or in response to the receipt of credentials held by or associated with a user device 104. In accordance with embodiments of the present disclosure, content from a content provider 124 ordered through a user device 104 can be delivered to an output device 120, without requiring that the content pass through the user device 104.

The communication server 112 can also provide a plurality of virtual player sessions 132, with one virtual player session 132 instance allocated for each connected user device 104. An allocated virtual player session 132 allows content from a content provider 124 obtained using credentials associated with a user and/or a user device 104 to be delivered to the communication server 112 over the second network 116. The content is then passed from the communication server 112 to the paired or selected output device 120 using the on-site distribution network 118. Accordingly, the communication server 112 implements a proxy function on behalf of the user device 104. In the embodiment illustrated in FIG. 1, with the communication server 112 on the premises of, for example, a hotel or other hospitality facility, the communication server 112 also can include a plurality of digital rights management (DRM) bridges and/or encoders 136, with one DRM bridge and/or encoder 136 instance allocated for each virtual player session 132. As can be appreciated by one of skill in the art after consideration of the present disclosure, a DRM bridge translates entitlement rights from one DRM entitlement domain to another. An encoder can, for example, transform the bitrate, resolution, or encoded format of the streaming media. An internal network interface 140 routes content from the DRM bridges and/or encoders 136 to the output devices 120 via the on-site content distribution network 118. More particularly, a DRM bridge and/or encoder 136 (e.g., DRM bridge and/or encoder 136a) allocated to a particular user device 104 (e.g., user device 1 104a) can route content obtained from a content provider 124 (e.g., content provider 1 124a) to an output device 120 (e.g., output device 120a) to which the user device 104 has been paired.

The second network 116 can comprise a high bandwidth connection between the communication server 112 and one or more content providers 124. Accordingly, the system 100a topology facilitates the delivery of content to output devices 120 by providing a relatively high bandwidth channel over which content can be delivered from a content provider 124 to a virtual player session 132 that is associated with the on-site content distribution network 118. Moreover, the proxy function of the communication server 112 allows that content to be sent to the output device 120 without requiring that the content pass through the first network 108, which is typically a relatively low bandwidth network.

The on-site content distribution network 118 can include, for example, but without limitation, an on-premises network. As examples, the on-site content distribution network 118 can comprise a first network section 144 that supports a DTCP-IP, Pro:Idiom encrypted MPEG-4, NDS, Widevine, or any other current or future video transmission and/or digital rights management (DRM) protocol to deliver content from a virtual player session 132 to an output device 120, either directly or through an intermediate device, such as an edge quadrature amplitude modulation (QAM) modulator 148, an over-the-top (OTT) device 162, or a set-top box 161 (see FIGS. 3, 5, and 7). Examples of OTT devices 162 include, but are not limited to, a CHROMECAST stick, a ROKU box, an APPLE TV box, a smart TV that provides OTT functionality, or the like. The on-site content distribution network 118 can further include, for example, a radio frequency (RF) or Internet Protocol (IP) section. Where, as in the example of the system 100a illustrated in FIG. 1, the communications server 112 is an "on-premises" server, the QAM modulators 148 can be integrated with and/or can be in close physical proximity to the communication server 112. Alternatively, the QAM modulators 148 can be implemented as one or more stand-alone devices.

The content provider 124 may comprise, for example, an online service. The content available from a content provider 124 can include, but is not limited to, movies, television shows, video, audio, or other content. Moreover, such content can be accessed from the content provider on an on-demand basis. In a typical implementation, content in the form of video can be streamed from the content provider 124 to a receiving device. The content provider 124 may provide a portal that is adapted to interface with a content provider app 106 running on a user device 104 and connected to the content provider 124 via the Internet 114, and can be implemented by, for example, a web server and associated programming.

Figure 2:
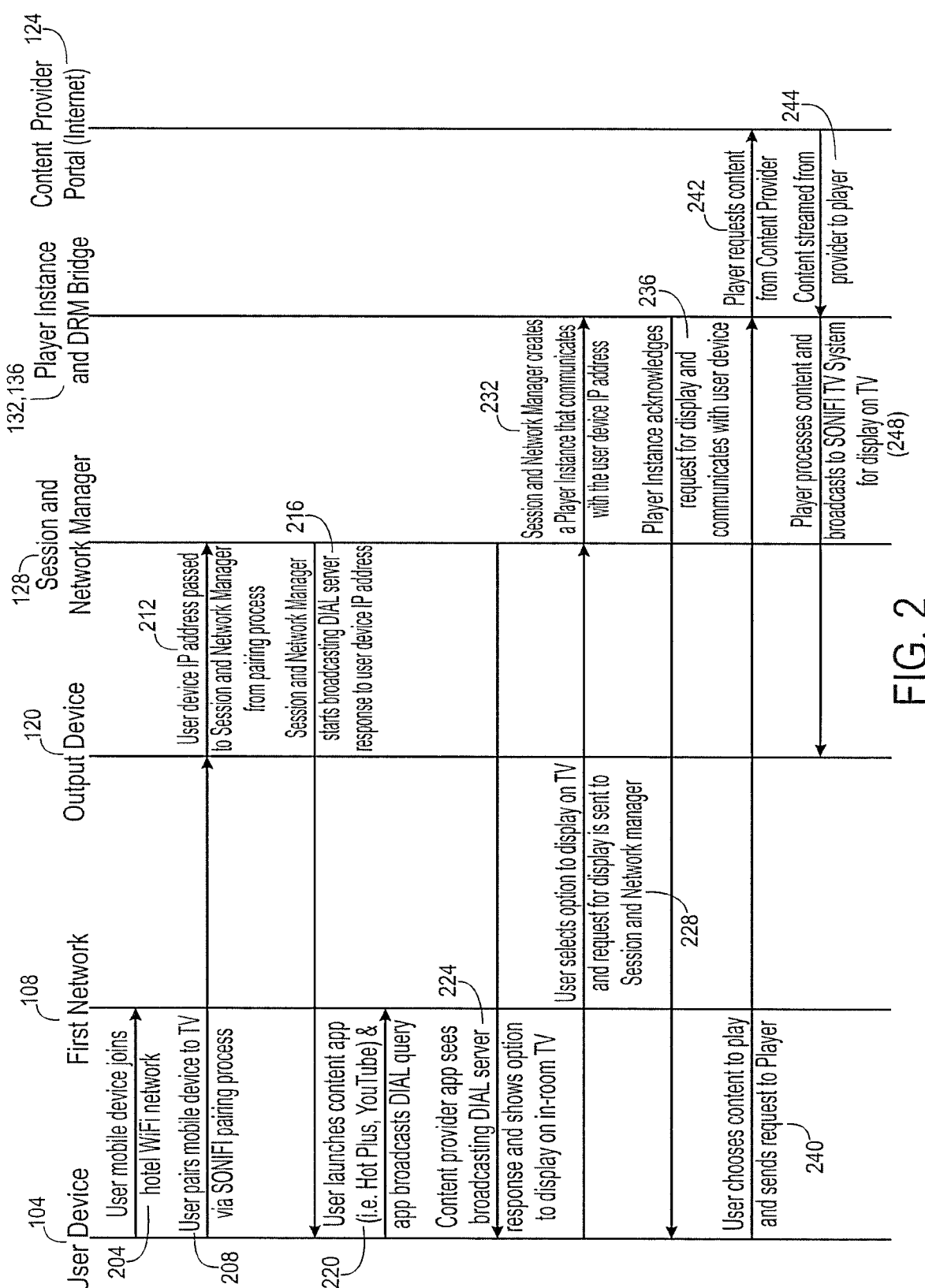
FIG. 2 depicts a process for selecting and delivering content using a system as depicted in FIG. 1.

With reference now to FIG. 2, aspects of the operation of a system for selecting and delivering content 100a are depicted. Initially, at step 204, a user device 104 joins the first network 108. In accordance with an exemplary embodiment of the present disclosure, the first network 108 may comprise a hotel Wi-Fi network, in which case joining the first network 108 can include establishing a connection to a network access point 109 and providing credentials or authorization, such as a user name and password. Next, at step 208, the user can pair the user device 104 to an output device 120 using a pairing process.

In general, pairing involves establishing a relationship between a particular user device 104 and a particular output device or set of output devices 120. Alternatively or in addition, pairing can include registering the user device 104 with the communication server 112, with or without associating the user device 104 with a particular output device 120. Pairing can be accomplished using any of various techniques. For instance, the user of a user device 104 can operate a browser or a specially provided app 107 on the user device 104 that places the user device 104 in communication with the communication server 112. The user can then provide identifying information, a pairing code, credentials, authentication information, or other information to the communication server 112 to validate or support the requested pairing relationship. Examples of techniques that can be used to accomplish pairing are disclosed in U.S. patent application publication number 2012/0324076 and U.S. patent application publication number 2012/0322384, the entire disclosures of which are incorporated herein by reference in their entirety. In accordance with further embodiments, pairing or registering the user device 104 with the communication server 112 can be performed when a user checks in as a guest of a hospitality facility, or when a user establishes a connection through a guest Internet access portal. At step 212, the IP address of the user device 104 is passed to the session and network manager 128 as part of the pairing process. Thus, in accordance with the least some embodiments of the present disclosure, a user device 104 is effectively registered with the communication server 112 as part of the pairing process.

In response to registering the user device 104 to the communication server 112, the session and network manager 128 running on the communication server 112 and implementing a DIAL server function starts broadcasting a DIAL server response to the user device 104 IP address (step 216). Therefore, in accordance with at least some embodiments of the present disclosure, the communication server 112, and in particular the session and network manager 128, directs the DIAL server response to the paired user device 104 IP address. The user of the user device 104 can then launch a content provider application or app 106 on the user device 104, which broadcasts a DIAL query (step 220). Examples of a content provider app 106 include, but are not limited to, Hulu Plus, YouTube, and Netflix apps. The content provider app 106 sees the broadcasting DIAL server response and presents the user with an option to display content on an output device 120 identified by the DIAL server response, such as an in-room television (step 224). The user can then make a selection of a particular output device 120. Alternatively, an output device 120 may be selected automatically or as a result of a previous action, such as the completion of a pairing process with respect to a specific output device 120.

In accordance with embodiments of the present disclosure, the DIAL server response is directed to the IP address of the user device 104 that sent the DIAL query, rather than being broadcast to, for example, all of the user devices 104 connected to the first network 108. For example, communication server 112 may direct to the response to a specific user device 104 using the MAC address, IP address, or other identifier of the user device 104. Moreover, embodiments of the present disclosure do not require that the user device 104 and the output device 120 be on the same sub-network or network. Indeed, in various exemplary embodiments disclosed herein, the user device 104 and the output device 120, operated in connection with the user device 104, are on different networks. The output device 120 options offered by the DIAL server and implemented by the session and network manager 128 may be limited to the output device or devices 120 in the immediate vicinity of the user device 104 associated with the content provider app 106 that initiated the DIAL query. Moreover, information regarding appropriate output devices 120 to be offered to the user device 104 may be obtained as part of the pairing process. For example, in a hotel environment, a user device 104 associated with a guest may be provided with a list of output devices 120 comprising televisions located in that guest's room. As other examples, specific output devices 120 may be associated with specific groups of rooms, including guest or conference rooms, areas, or access credentials. Accordingly, embodiments of the present disclosure provide a customized set of output devices 120 that can be made available to a particular user device 104, enabling use of DIAL and other discovery protocols in a multiple user, multiple output device 120 environments.

The user can then select the option to display content on the output device 120, which causes a request for display to be sent to the session and network manager 128 (step 228). The session and network manager 128 creates a virtual player session or player instance 132 that communicates with the user device 104 IP address (step 232). The player instance 132 acknowledges the request for display and communicates with the user device 104 (step 236). Such communications can include the player instance 132 providing status information to the app 106 on the user device 104 and the app 106 providing selection and control instructions to the player instance 132 for delivery to the content provider 124. In addition, credentials necessary to access content available from the content provider 124 may be provided from the app 106 for delivery to the content provider 124.

The user, by providing input to the content provider app 106 running on the user device 104, then chooses content to play, and that request is sent to the player instance 132 (step 240). The player instance 132 then requests the content from the appropriate content provider 124 (step 242). The requested content is streamed from the content provider 124 to the player instance 132 over the relatively high bandwidth second network 116 (step 244). The player instance 132 then processes the content and sends that content to the on-site distribution network 118 for routing to and outputting by the selected output device 120 (step 248). In accordance with embodiments of the present disclosure, the player instance 132 can, prior to broadcasting the content to the on-site distribution network 118, provide that content to a DRM bridge and/or encoder instance 136. Accordingly, the content requested at the user device 104 is delivered from the content provider 124 to the output device 120 without passing through the user device 104. Moreover, the content is delivered without passing through the first network 108.

Accordingly, embodiments of the present disclosure facilitate the selection and delivery of content in connection with a user device 104 running a content provider app 106 that includes or can provide credentials to the content provider 124 and that can also be used to select content. More particularly, embodiments of the present disclosure enable a user to obtain selected content from a content provider 124, including, but not limited to, a content provider 124 located in the cloud (i.e., accessible through the Internet 114), using their own user device 104. The display of selected content is facilitated by providing a DIAL server response from the communication server 112 that constrains the set of available output devices 120 to those relevant to the user. Moreover, access by a user device 104 to an output device 120 can be controlled by the communication server 112 based on various rules and conditions, such as authorization, payment, location, or the like. In addition, by providing a virtual player instance 132 associated with a communication server 112 that is capable of communicating with a content provider 124 over a high-bandwidth network 116, bandwidth constraints and/or costs that might be incurred if such content were delivered through the user device 104 itself can be avoided.

Figure 3:
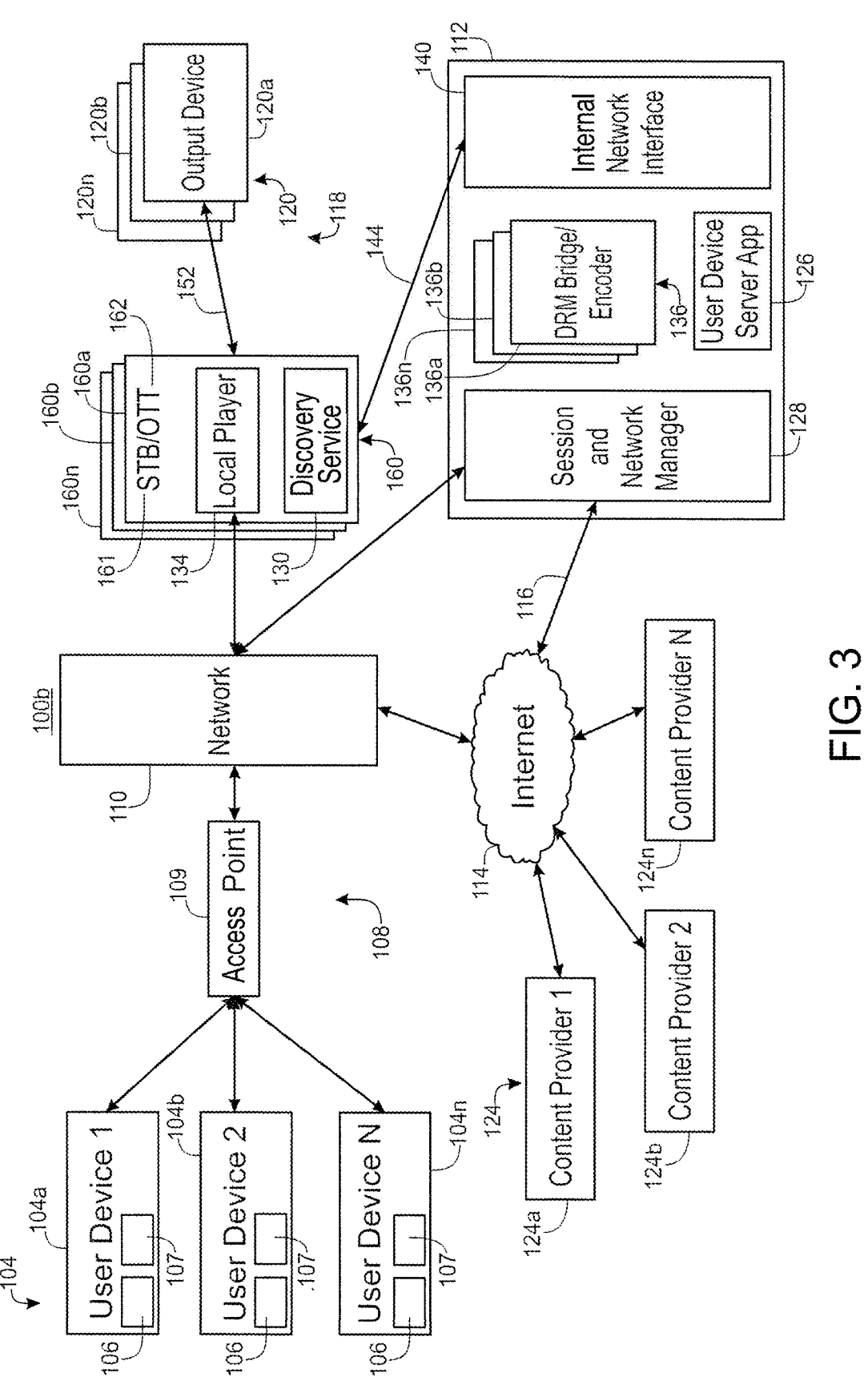
FIG. 3 depicts a system for selecting and delivering content in accordance with other embodiments of the present disclosure.

FIG. 3 illustrates an alternate system in accordance with embodiments of the present disclosure for selecting and delivering content 100, and in particular a system 100b that enables the user device 104 to be selectively connected to an output device 120 through a device adapter 160, such as a set-top box (STB) 161 or an over-the-top (OTT) device 162. Accordingly, this system 100b differs from the system 100a illustrated in FIG. 1 in that this system 100b operates in association with a device adapter 160 in the form of a set-top box 161 or an OTT device 162 that performs local player 134 and discovery service 130 functions, and that is paired or connected to an output device 120. These discovery service 130 functions can include, but are not limited to, DIAL server or multicast Domain Name System (mDNS) functions. Accordingly, the discovery service 130 can include a zero configuration service. Moreover, the discovery service 130 can be provided by or as part of a device adaptor 160 operating system or firmware, or as part of network or connectivity software installed on the device adaptor 160, such as AVAHI or BONJOUR. Therefore, the communication server 112 need not include a virtual player session 132. In such embodiments, connections are established between user devices 104 and device adaptors 160. Accordingly, the session and network manager 128 can create and manage lists of device adaptors 160, control the visibility of device adaptors 160, and control active connections between user devices 104 and device adaptors 160, in addition to creating and managing lists of user devices 104 that are paired or otherwise registered with the system 100.

In accordance with embodiments of the present disclosure, a set-top box 161 and an OTT device 162 may operate similarly in that they both can receive content from a network connection and can provide that content to an output device 120. Although an OTT device 162 may conventionally support a direct connection to a user device 104, embodiments of the present disclosure control the ability of an OTT device 162 to be discovered by and connected to a user device 104. Specifically, the communication server 112 controls when and how discovery of a device adapter 160 occurs. As shown in the figure, the device adaptor 160 may include connections to the first network 108 and to the on-site content distribution network 118. Moreover, the connection to the first network 108 can be direct or through the communication server 112. In addition, in this example, the first section 144 of the on-site content distribution network 118 may comprise a device adapter 160 compliant DRM content channel, such as an IP or coaxial cable distribution network, and the second section 152 may be in the form of an HDMI or other direct connection between the device adapter 160 and an associated output device 120, such as but not limited to a television.

Figure 4:
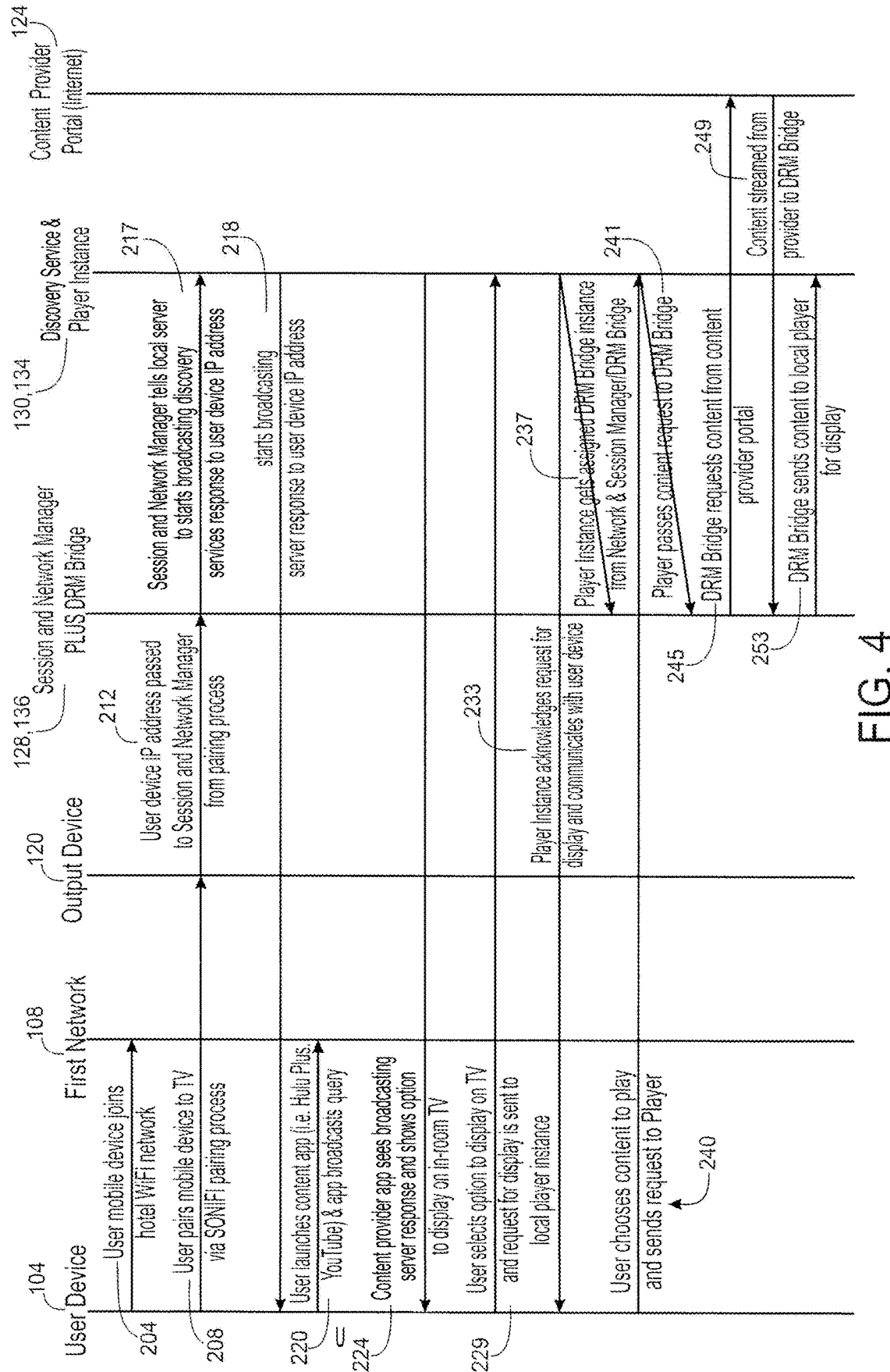
FIG. 4 depicts a process for selecting and delivering content using a system as depicted in FIG. 3.

FIG. 4 illustrates aspects of the operation of the system for selecting and delivering content 100b. More particularly, steps for advertising a selected output device 120 and device adaptor 160 pair to a user device 104 are described. Initially, at step 204, a user device 104 joins the first network 108, the user pairs the user device 104 to an output device 120 (step 208), and the user device IP address is passed to the session and network manager 128 running on the communication server 112 (step 212). Accordingly, these steps can be the same as or similar to those taken with respect to the first exemplary embodiment. More particularly, where the user device 104 pairs to a specific output device 120, information regarding the output devices 120 and associated device adaptors in that room can be used to determine the set of output devices 120 that will be visible to the user device 104. For example, the allowed set of output devices 120 may be all of the output devices in the room of the user associated with the user device 104. As another example, pairing to a single output device 120 may result in the session and network manager making only that single output device 120, or the device adaptor associated with that output device 120, visible to the user device 104. In accordance with still other embodiments, pairing can be accomplished separately from an output device 120. For example, registration at a hotel or other facility, establishing connectivity with a network through a guest Internet access process, or providing credentials from the user device 104 to the communication server 112 directly, or other processes can be used. In such embodiments, the set of output devices 120 that are visible to a user device 104 can be determined through property records regarding output devices 120 in a registered guest's room, or other information.

At step 217, the session and network manager 128 tells the local discovery service 130 implemented by the device adaptor 160 to start broadcasting a discovery service 130 response to the user device 104 IP address, which is performed at step 218. Thus, in accordance with at least some embodiments, the discovery service 130 response is sent only to the user device 104 that was paired to the system 100b as part of the pairing process. As can be appreciated by one of skill in the art after consideration of the present disclosure, this may be different than a typical implementation of a discovery scenario in which a target device multicasts a message that includes its IP address information. In addition, the user device 160 is only provided with a discovery service 130 response from those device adaptors 130 to which the user device 104 is authorized to connect. Accordingly, in a typical scenario, the communication server 112 makes at least one device adaptor 160 visible to the user device. Moreover, the communication server 112 does not allow all of the device adaptors 160 in the system 100 to be visible to the user device.

The user of the user device 104 then launches a content provider application or app 106 on the user device 104 and the content provider app 106 broadcasts a discovery service query (step 220). The content provider app 106 sees the broadcasting discovery service 130 response and shows an option to display content on an output device 120, such as an in room-television (step 224). In accordance with embodiments of the present disclosure, this option is presented only to the user device 104 from which the discovery service query was sent.

The user can then select the option to display content on the output device 120 and a request for display is sent to the local player instance 134 (step 229). At step 233, the local player instance 134 acknowledges the request for display and communicates with the user device 104.

Next, the local player instance 134 is assigned a DRM bridge instance 136 (step 237). At step 240, the user operates the user device 104 and the content provider app 106 to choose content to play and sends that request to the local player instance 134. The local player instance 134 passes the content request to the assigned DRM bridge instance 136 (step 241). The DRM bridge instance 136 in turn requests content from the content provider 124 (step 245). The requested content is then streamed from the content provider 124 to the DRM bridge instance 136 over the high-bandwidth network 116 (step 249), and the DRM bridge instance 136 sends the requested content to the local player instance 134 for display on the attached output device 120 (step 253).

In accordance with still other embodiments, the user device 104 can send content to the local player instance 134 on the device adaptor 160 without involving a DRM bridge instance 136. For example, locally stored content can be "cast" from the user device 104 to the device adaptor 160 and the associated output device 120, without requiring any further processing or involvement of the communication server 112.

Accordingly, embodiments of the present disclosure can allow a user to select and order content from a content provider 124 with whom the user has a subscription or other arrangement using their own user device 104. Embodiments of the present disclosure also enable the selected content to be delivered to a set-top box 161 associated with and that is local to (e.g., in the same room as) a television or other output device 120 over a relatively high-bandwidth network

116. Moreover, the content does not need to pass over the relatively low bandwidth first network 108 or through the user device 104.

Figure 5:
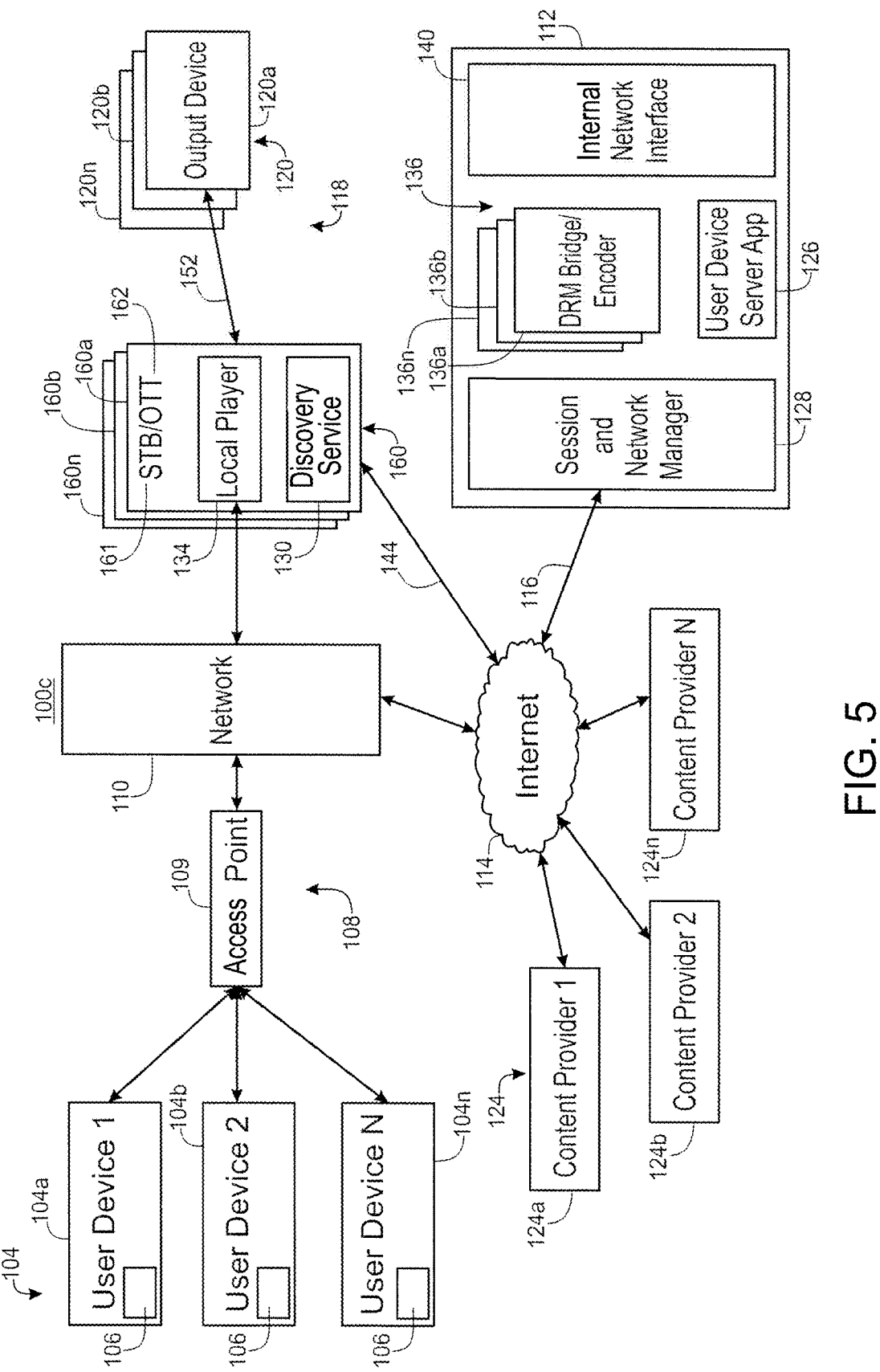
FIG. 5 depicts a system for selecting and delivering content in accordance with other embodiments of the present disclosure.

In FIG. 5, illustrates another exemplary embodiment in accordance with embodiments of the present disclosure of a system for selecting and delivering content 100, and in particular a system 100c with a cloud-based communication server 112 that can selectively control the discovery of and communication to an output device 120 by a user device 104, where the output device 120 is accessed through a device adapter 160, such as a set-top box 161 or an over-the-top device 162. Like the previously described system 100b, this system 100c includes a device adaptor 160. However, the communication server 112 is implemented in the cloud rather than on-site. Accordingly, the on-site content distribution network 118 of the exemplary system 100c includes a first network section 144 comprising an Internet connection that connects the device adaptor 160 to the communication server 112 located in the cloud via the Internet 114. As examples, the first network section 144 can therefore include a combination of network and/or communication channel types, such as a coaxial cable distribution network, a satellite distribution network, and/or an IP distribution network.

Figure 6:
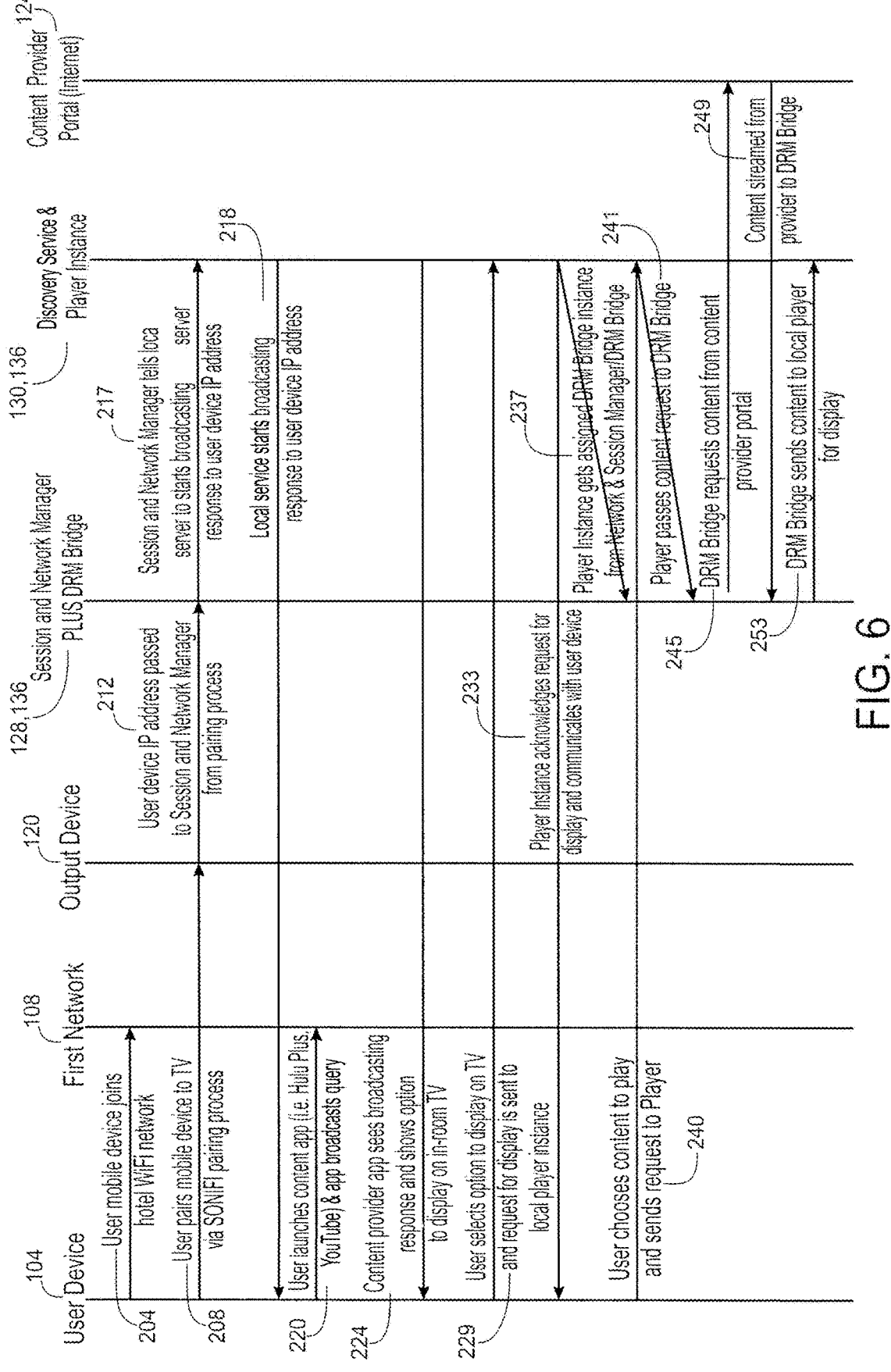
FIG. 6 depicts a process for selecting and delivering content using a system as depicted in FIG. 5.

FIG. 6 illustrates aspects of the operation of a system for selecting and delivering content 100c according to this further exemplary embodiment. As with other embodiments, the process can start with the user device 104 joining the first network 108 (step 204), pairing the user device 104 to the output device 120 (step 208), and passing the user device 104 IP address to the session and network manager 128 (step 212). In addition, the subsequent steps (i.e., steps 217-253) can be similar to or the same as those described in connection with the second exemplary embodiment of a system for selecting and delivering content 100b. Accordingly, at step 217, the session and network manager 128 tells the discovery service 130 running on the local device adaptor 160 to broadcast a discovery service response to the user device 104 IP address. The local discovery service 130 starts broadcasting the discovery service response to the user device 104 IP address (step 218). At step 220, the user launches a content app 106 on the user device 104, and that app 106 broadcasts a discovery service query (step 220). The content provider app 106 sees the broadcasting discovery service 130 response and presents an option to the user to display content on an output device 120, such as an in-room television (step 224). In accordance with further embodiments of the present disclosure, where multiple output devices 120 are available to a user, the option to display content can include the option to select from a number of output devices 120. For example, the session and network manager 128 can control the discovery services 130 of all of the device adaptors 160 associated with all of the output devices 120 in the hotel room of the user of the user device 104 to direct a response to the user device 104 so that all of the output devices 120 are available for selection. Whether one or more than one output device 120 is available for selection, the option to display content on an output device 120 in response to a discovery service query sent from a particular user device 104 is only provided to that particular user device 104.

At step 229, the user selects the option to display content on an output device 120 and the request for display is sent to the local player instance 134 implemented by or running on the device adaptor 160. The local player instance 134 acknowledges the request for display and communicates with the user device 104 (step 233). The player instance 134 is assigned a DRM bridge instance 136 on the communication server 112 (step 237).

The user then chooses content to play by entering an appropriate input at the user device 104 through the content provider app 106, which sends the request to the local player 134 (step 240). The local player instance 134 passes the content request to the assigned DRM bridge 136 (step 241). The DRM bridge 136 then requests content from the content provider 124 (step 245). Content is then streamed from the content provider 124 over the Internet 114 to the DRM bridge 136 (step 249). The DRM bridge then sends transcribed or transformed content to the local player 134 over the Internet 114 for delivery to the selected output device 120 (step 253). More particularly, the transcribed content can be passed from the DRM bridge 136 over the high-bandwidth second network 116, across the Internet 114, and to the set-top box 161 via the first section 144 of the on-site content distribution network 118. The local player 134 then delivers the content to the output device 120 via the second section 152 of the on-site content distribution network 118. As can be appreciated by one of skill in the art after consideration of the present disclosure, communications with the communication server 112 between a user device 104, as well as between the communication server 112 and a content provider 124, are at least partially transmitted over the Internet 114.

Figure 7:
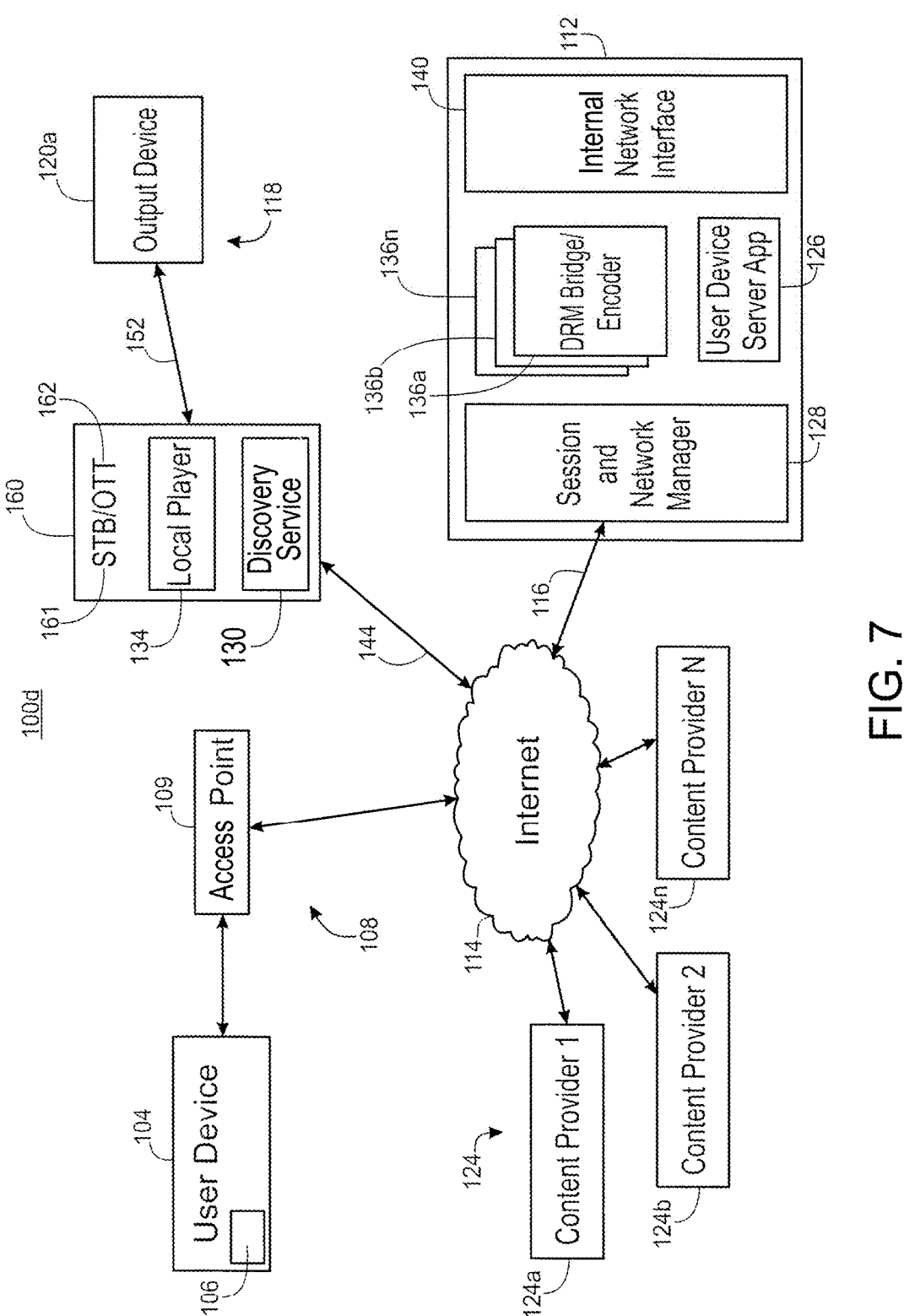
FIG. 7 depicts a system for selecting and delivering content in accordance with other embodiments of the present disclosure.

FIG. 7 illustrates still another exemplary embodiment in accordance with embodiments of the present disclosure of a system for selecting and delivering content 100, and in particular a system 100*d* in which a communication server 112 controls the delivery of and connection with an output device associated with an access device 160, such as a set-top box 161 or an OTT device 162. This embodiment is similar to the system 100*c* described in connection with FIG. 5 in that it features a communication server 112 located in the cloud and a device adaptor 160 connected directly to an output device 120 provided as part of an on-site content distribution network 118. The system 100*d* of FIG. 7 differs from the system 100*c* of FIG. 5 in that it includes a single user device 104. Accordingly, the system for selecting and delivering content 100*d* is an example of an embodiment implemented in a home environment. In the exemplary system 100*d*, the user device 104 is connected to a first network 108 that includes at least an access point 109, which is in turn connected to the Internet 114. More particularly, the first network 108 may, for example, include a Wi-Fi network that is connected to the Internet 114. For instance, the first network 108 can include a modem that connects a wireless and/or wireline access point 109 to an Internet Service Provider via a cable network, digital subscriber line, Wi-Max, cellular, or other connection. Moreover, the device adaptor 160 may or may not be associated with the same first network 108 and or sub-network as the user device 104. For instance, the device adaptor 160 may be connected to the Internet 114 by a cable, satellite, Wi-Max, or other network. The remainder of the system 100*d* may be the same as or similar to the system 100*c* shown in FIG. 5.

Figure 8:
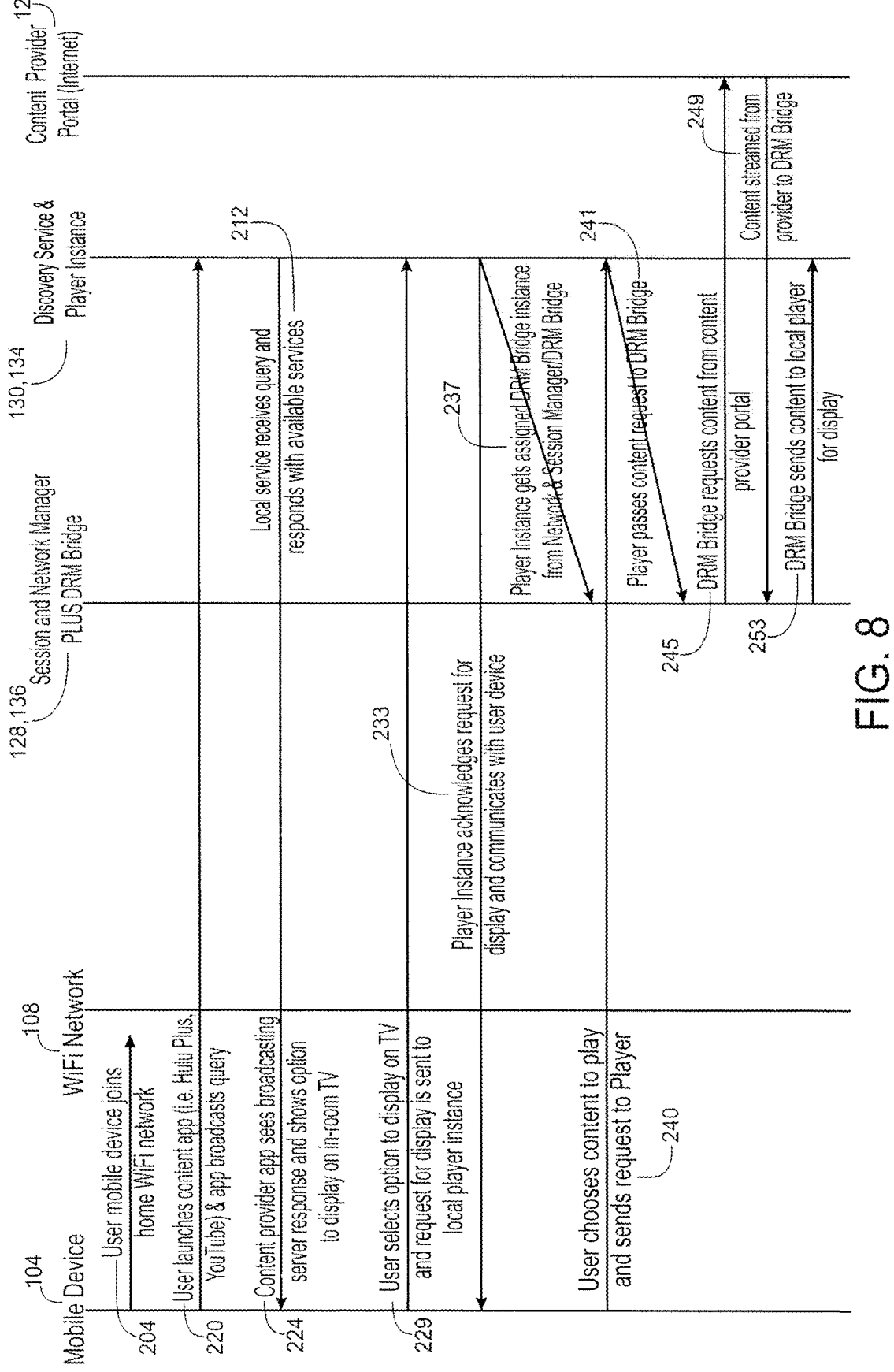
FIG. 8 depicts a process for selecting and delivering content using a system as depicted in FIG. 7.

FIG. 8 illustrates aspects of the operation of the system 100*d* shown in FIG. 7. Initially, at step 204, the user device 104 joins the first network 108. This can include entering or selecting a service set identifier (SSID) and/or a password. The user then launches a content app 106 on the user device 104 and that app broadcasts a discovery service query (step 220). The content provider app 106 sees the broadcasting discovery service 130 response and presents an option to the user to display content on an output device 120, such as a television in the user's home (step 224). In accordance with further embodiments of the present disclosure, where multiple output devices 120 are available to a user, the option to display content can include the option to select from a number of output devices 120.

At step 229, the user selects the option to display content on an output device 120 and the request for display is sent to the local player instance 134 implemented by or running on the set-top box 161. The local player instance 134 acknowledges the request for display and communicates with the user device 104 (step 233). The player instance 134 is assigned a DRM bridge instance 136 on the communication server 112 (step 237).

The user then chooses content to play by entering appropriate input at the user device 104, through the content provider app 106, which sends the request to the local player 134 (step 240). The local player instance 134 passes the content request to the assigned DRM bridge 136 (step 241). The DRM bridge 136 then requests content from the content provider 124 (step 245). Content is then streamed from the content provider 124 over the Internet 114 to the DRM bridge 136 (step 249). The DRM bridge then sends transcribed or transformed content to the local player 134 over the Internet 114 for delivery to the selected output device 120 (step 253). More particularly, the transcribed content can be passed from the DRM bridge 136 over the high-bandwidth second network 116, across the Internet 114, and to the set-top box 161 via the first section 144 of the on-site content distribution network 118. The local player 134 then delivers the content to the output device 120 via the second section 152 of the on-site distribution network 118. However, as can be appreciated by one of skill in the art after consideration of the present disclosure, communications with the communication server 112 between a user device 104, as well as between the communication server 112 and a content provider 124, are at least partially transmitted over the Internet 114.

Therefore, embodiments of the present invention enable a user to control the delivery of content over high-bandwidth channels using a user device 104. In addition, the provision of a cloud-based communication server 112 facilitates the administration of DRM and encoder technologies.

Although various components of the exemplary systems 100 disclosed herein have been illustrated in multiples of particular numbers, it should be appreciated that any number of such components may be provided. For instance, while three user devices 104*a*, 104*b*, and 104*n* are shown in various figures, any number of such user devices 104 can be associated with a system. Moreover, various components can be assigned on an ad hoc or an as available basis. For example, a request to pair initiated by any user device 104*a-n* may be serviced by any one virtual player session 132*a-n*, content can be requested and obtained from any otherwise available content provider 124*a-n*, any DRM bridge/encoder 136*a-n* may perform transcription functions, and any QAM modulator 148*a-n* may generate a QAM signal that is sent to any selected and connected output device 120*a-n*.

Figure 9:
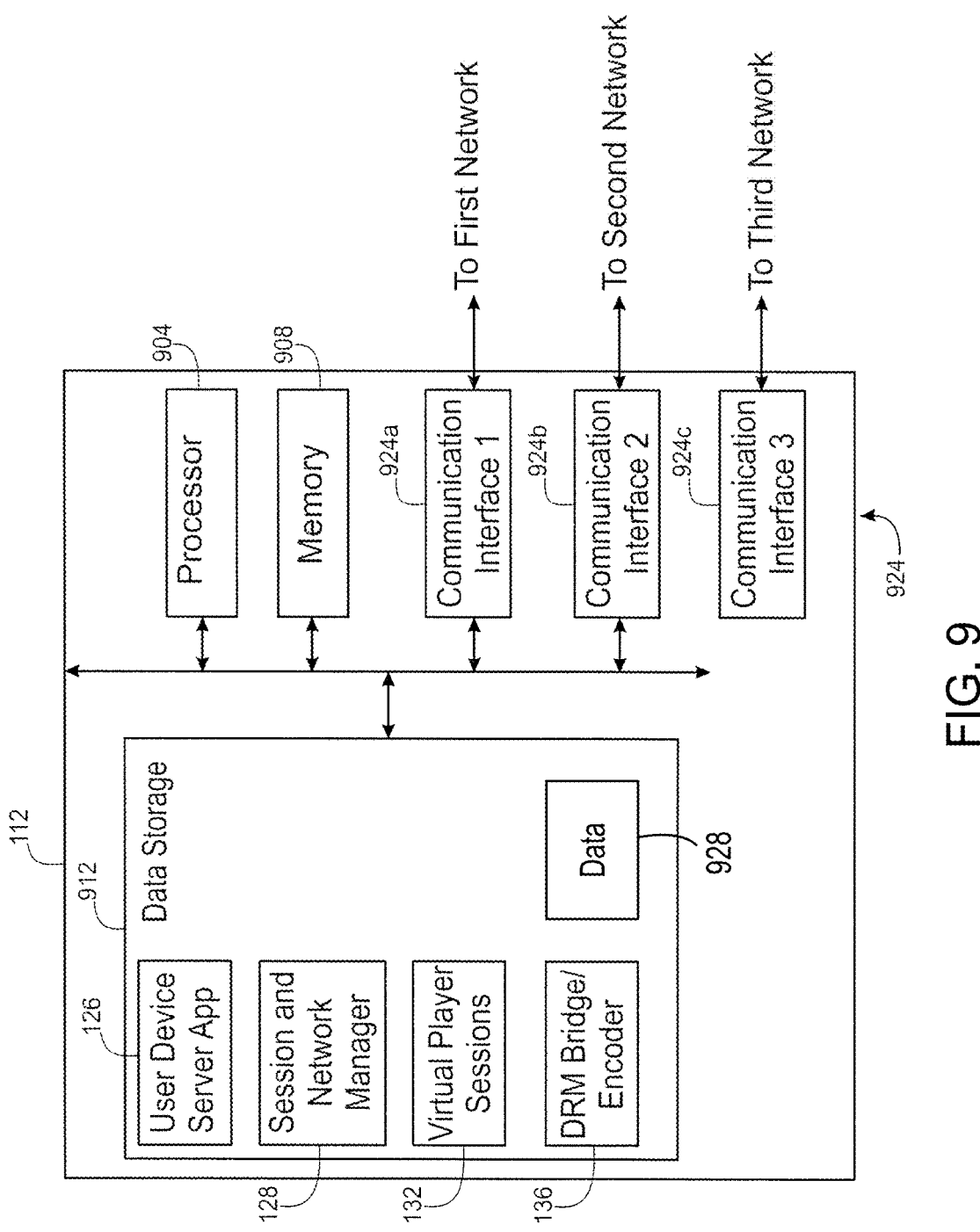
FIG. 9 depicts aspects of a communication server in accordance with embodiments of the present disclosure.

FIG. 9 is a block diagram illustrating components of a communication server 112 in accordance with embodiments of the present disclosure. In general, a communication server includes a processor 904 and memory 908. The processor 904 may comprise a general purpose programmable processor or controller for executing application programming or instructions. As a further example, the processor 904 may comprise a specially configured application specific integrated circuit (ASIC). The processor 904 generally functions to run programming code or instructions, such as applications or programs, implementing various functions of the communication server 112. The memory 908 is generally used in connection with the execution of application programming by the processor 904 and for the temporary or long-term storage of program instructions and/or data. As examples, the memory 908 may comprise removable secure digital storage, RAM, SDRAM, or other solid state memory.

A communication server 112 can also include data storage 912. In accordance with embodiments of the present invention, data storage 912 can contain program code or instructions implementing various applications or functions executed by the communication server 112. Like the memory 908, the data storage 912 can comprise a solid state memory device. In addition, in certain applications, the data storage 912 can be integrated with and/or indistinguishable from the memory 908. Alternatively or in addition, the data storage 912 may comprise a hard disk drive or other random access memory and/or can be interconnected to the communication server 112, for example as network attached storage. Programming or modules stored in the data storage 912 and executed by the processor 904 can include, as examples and without limitation, a user device server application 126, a session and network manager 128, virtual player session 132, and/or DRM bridge/encoder instances 136.

The communication server 112 also includes one or more communication interfaces 924. For example, a first communication interface 924a can provide a connection to the first network 108, a second communication interface 924b can provide a connection to the second network 116, and a third communication interface 924c can provide a connection to the first network section 144 of an on-site content distribution network 118. Data 928 stored in the data storage can include information identifying user devices 104 of registered guests or users, output device 120 information, device adaptor 160 information, and information regarding established connections between user devices 104 and device adaptors 160 and/or output devices 120.

Figure 10:
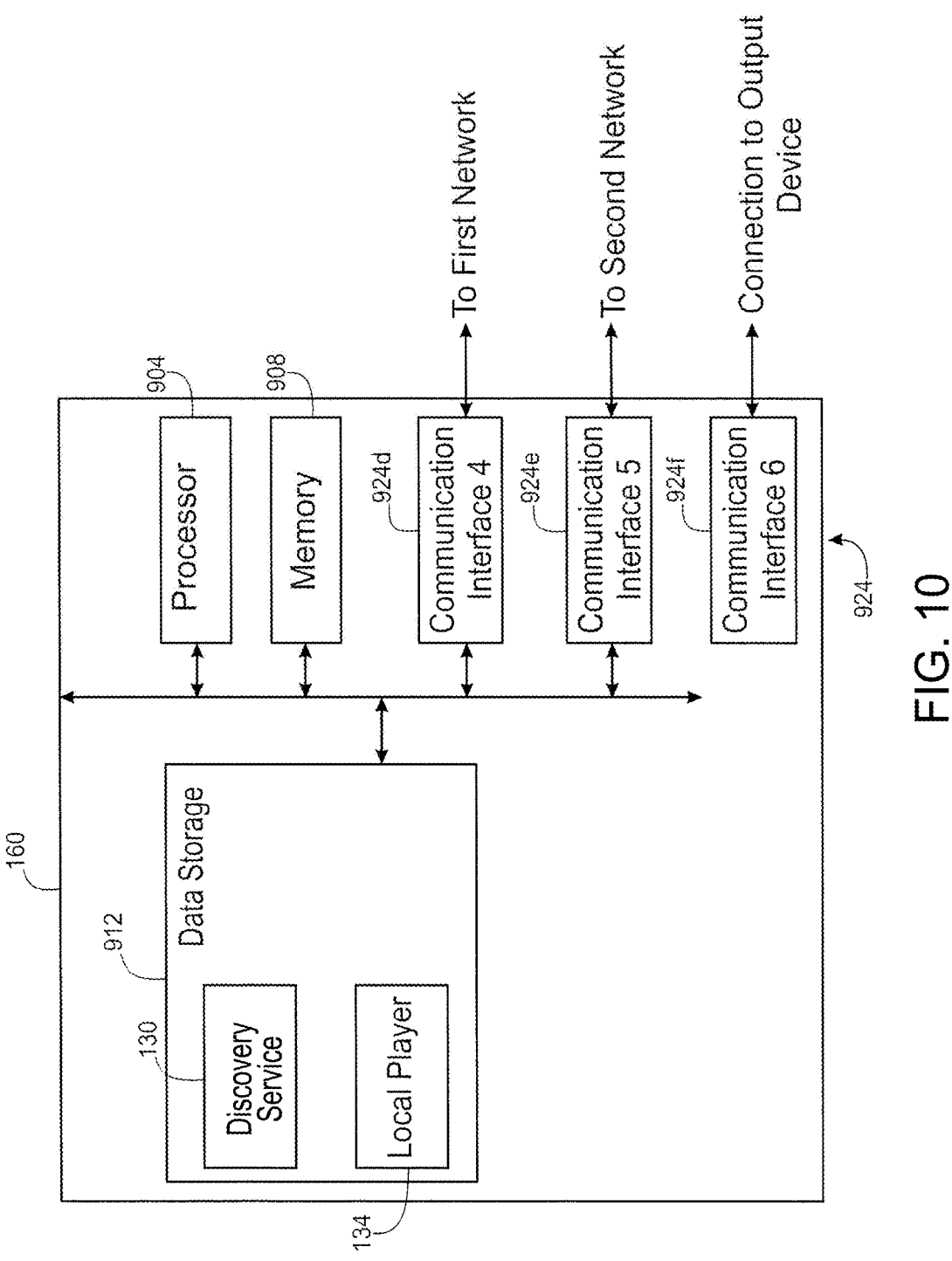
FIG. 10 depicts aspects of a device adaptor in accordance with embodiments of the present disclosure.

FIG. 10 is a block diagram illustrating components of a device adaptor 160 in accordance with embodiments of the present disclosure. Like the communication server 112, the device adaptor 160 can include a processor 904, memory 908, and/or data storage 912. Program code or instructions that can be stored in data storage 912 and executed by the processor 904 in connection with the memory 908, which can include, but is not limited to, a discovery service 130 function and a local player session 134. In addition, a device adaptor 160 can include one or more communication interfaces, such as a fourth communication interface 924d connecting the device adaptor 160 to the first network 108, a fifth communication interface 924e connecting the device adaptor 160 to the first network section 144 of the on-site content distribution network 118, and a sixth interface 924f connecting the device adaptor 160 to an output device 120.

Figure 11:
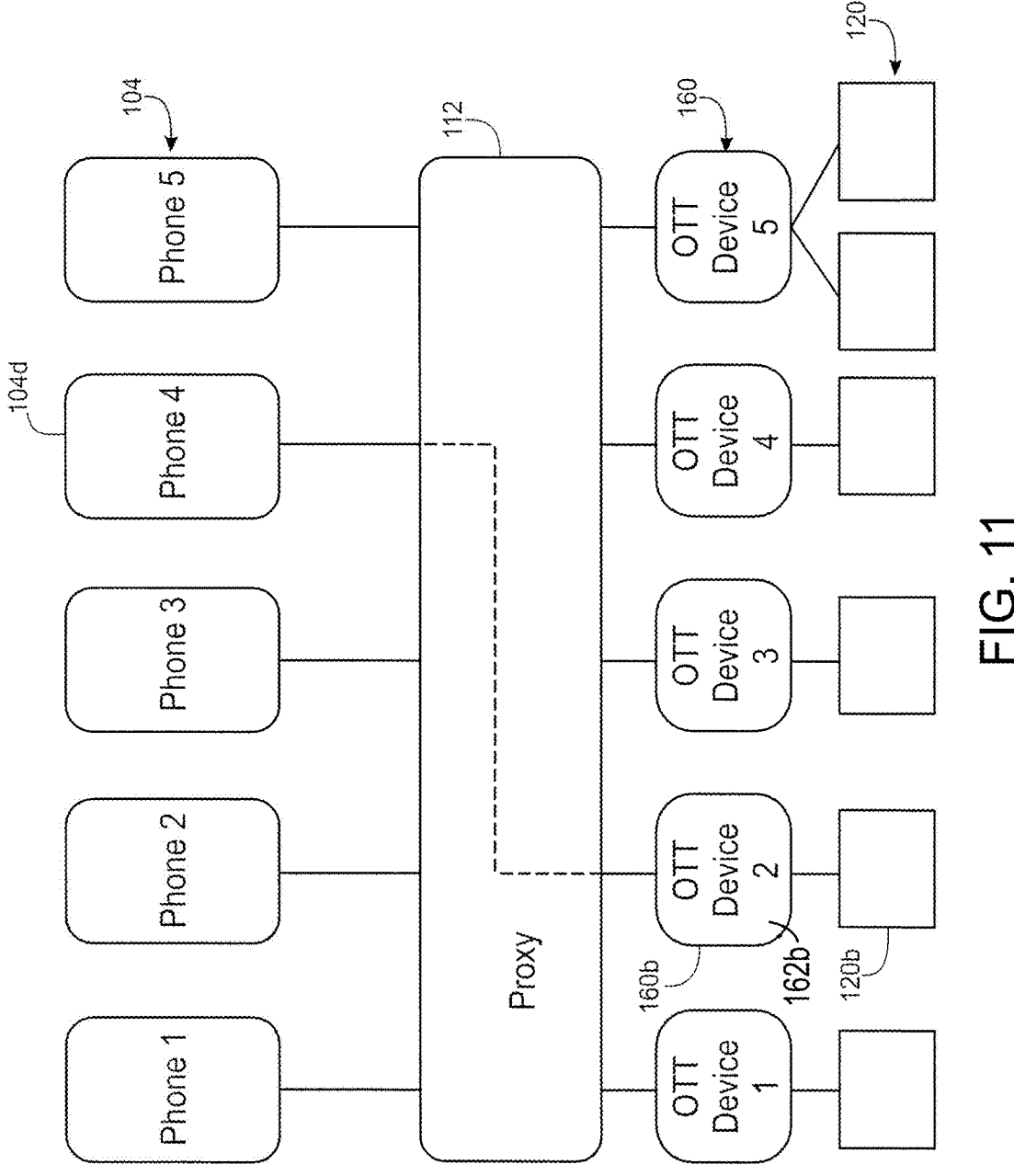
FIG. 11 depicts a scenario in which a user device is presented with a set of available output devices.

FIG. 11 depicts a scenario in which a user device 104 can be presented with a set of available output devices 120. More particularly, each of the output devices 120 may be associated with a device adaptor 160, such as a set-top box 161 or over-the-top device 162, such as in a system 100b, 100c, or 100d, by the communication server 112. The output devices 120 included in the set presented to the user device 104 can include those output devices 120 located in the room associated with the user device 104. A device adaptor 160 can be co-located with the output device 120 and with the user device 104. Alternatively, the device adaptors 160 and/or an associated output device 120 may be located remotely from the user device 104. The communication server 112 can connect any of the user devices 104 to any of the device adaptors 160. In the illustrated scenario, the communication server 112 allows the user device 4 104d to see a device adaptor 160, and in particular OTT device 2 162b, which is associated with output device 2 120b, but maintains isolation between the user device 104d and the other OTT devices 162. Moreover, the isolation maintained by the proxy function of the communication server 112 prevents the user device 104d from sensing or detecting the other OTT devices 162. In accordance with at least some embodiments, multiple communication servers 112 performing a proxy function can be provided. For example, multiple servers 112 can be used for load balancing purposes. Moreover, different servers 112 can be provided for supporting user devices 104 and device adaptors 160 in different areas of a property. Accordingly, user device 4 104d can operatively connect to the output device 120b, for example to display content on the output device 120b using the device adapter 160 (here an OTT device 162), but cannot make use of the other output devices 120.

Figure 12:
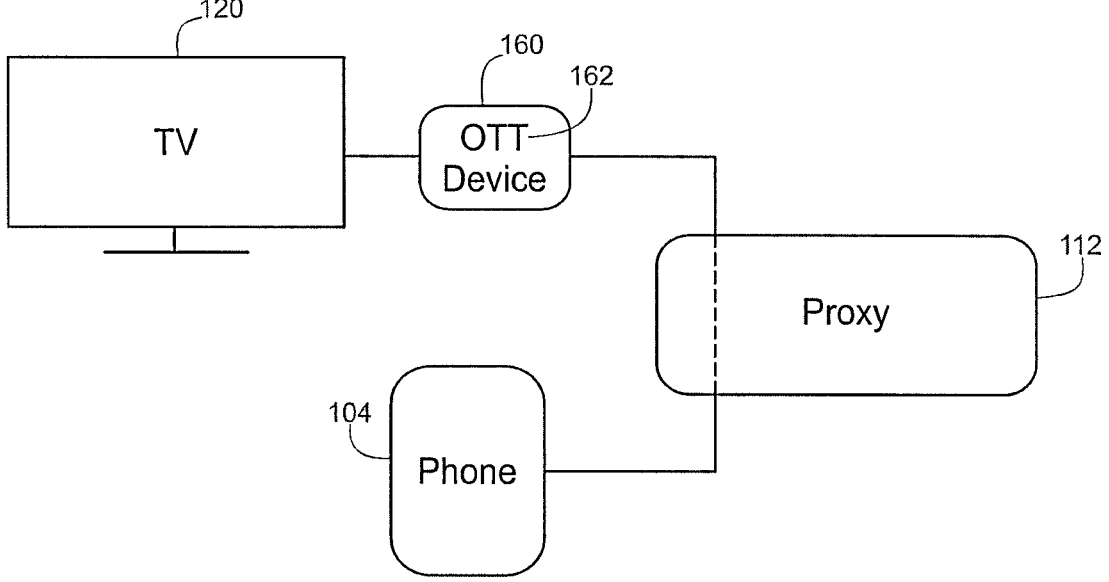
FIG. 12 depicts a scenario in which a user device is presented with an output device in the same room as an available output device.

FIG. 12 depicts a scenario in which the user device (for instance a smart phone) 104 is allowed to see an OTT device 162 connected to an output device (for example a TV) 120 in the same room as the user device 104. In this scenario, the user device 104 is connected to the output device 120 via the communication server 112 and the OTT device 162, for example as can be enabled by illustrated systems 100b, 100c, or 100d. As can be appreciated by one of skill in the art, device isolation requirements that are imposed in shared networks typically prevent a user device 104 from seeing other Wi-Fi devices, including a co-located OTT device 160, on such networks. However, embodiments of the present disclosure provide a communication server 112 that operates to identify the room that the user device 104 is associated with, and further operates to present the user device 104 with the option of connecting to the output device 120 through the OTT device 160 in the identified room. Moreover, the user device 104 is prevented from seeing OTT devices 160 and thus is prevented from connecting to output devices 120 that are not associated with the user's room or that the user is not otherwise authorized to access.

Figure 13:
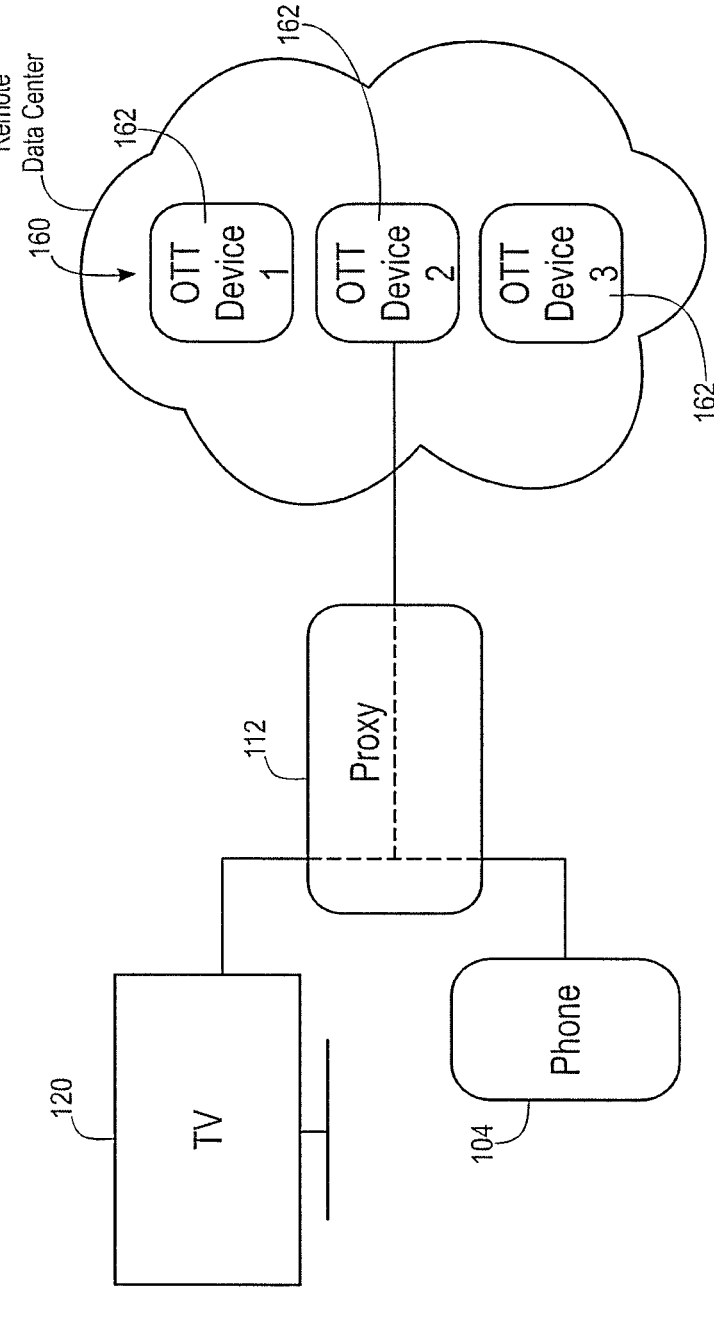
FIG. 13 depicts a scenario in which a connection to an output device is enabled through an over-the-top device located in a remote data center.

FIG. 13 depicts a scenario in which a connection between a user device 104 and an output device 120 is enabled using a device adaptor 160, such as an OTT device 162 included in an array of OTT devices 162 located in a remote data center. The connection between the user device 104 and the OTT device 162 is made through the communication server 112. In addition, the connection between the OTT device 162 and the output device 120 is made through the communication server 112. In this example, the association between the OTT device 162 and the output device 120 need not be fixed and can instead be determined dynamically. For example, the OTT device 162 that is assigned to the output device 120 by the communication server 112 can be selected from a number of available OTT devices 162 in the array by the communication server 112, or the assigned OTT device 162 may simply be the OTT device 162 that has been made available by the data center.

In various of the scenarios discussed herein, including those illustrated in FIGS. 11-13, the set of output devices 120 to which the user device 104 can connect through a device adaptor 160 is controlled by the communication server 112. Accordingly, the security concerns that give rise to the device isolation requirements of public Wi-Fi networks can be addressed while providing discovery of and connectivity between a user device 104 and select Wi-Fi devices 160. Moreover, in any of the scenarios multiple communication and/or proxy servers 112 can be utilized. Where multiple servers 112 are used, different servers can support different user device 104 and OTT device 160 pairings based on load, location, type of service, or other criteria.

Figure 14:
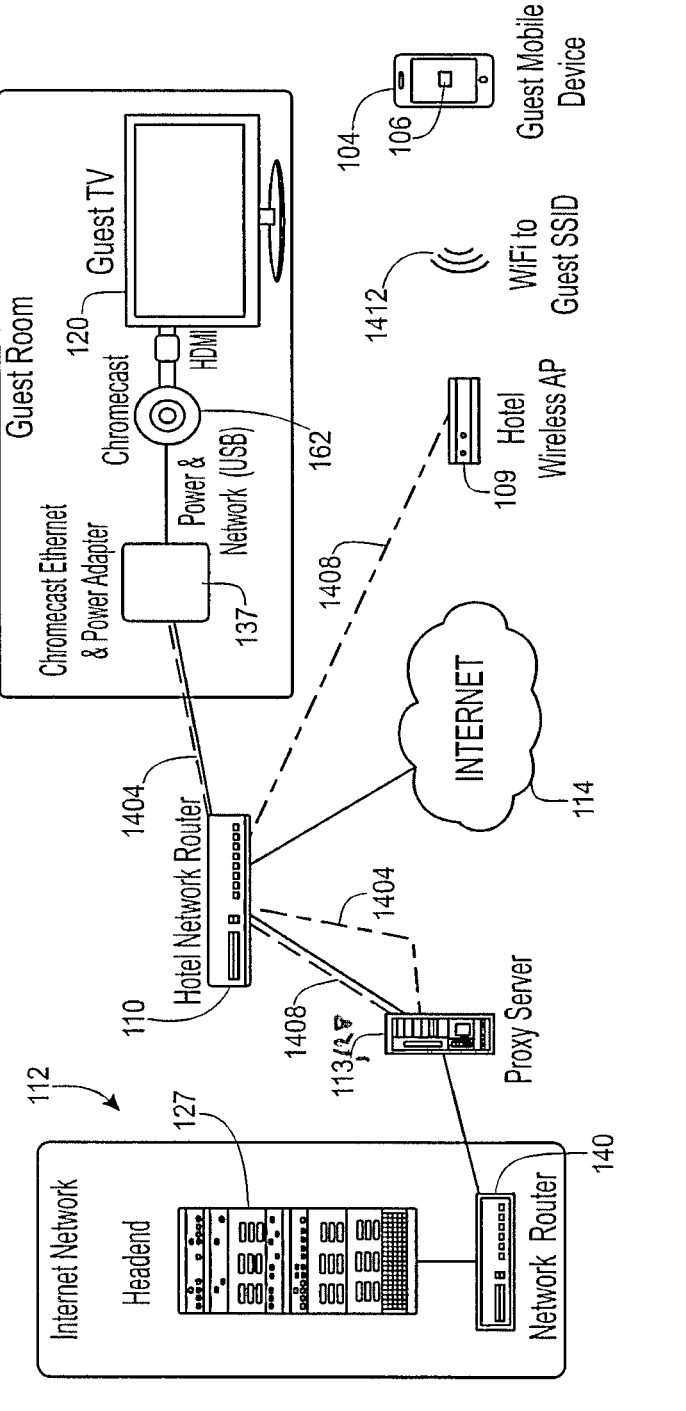
FIG. 14 depicts components of a system for selecting and delivering content in accordance with other embodiments of the present disclosure.

FIG. 14 depicts components of a system for selecting and delivering content in accordance with other embodiments of the present disclosure. The system generally includes a communication server system 112. The communication server system 112 can include or is connected to an OTT device 162 (e.g. a Chromecast) network 1404, a guest IP network 1408, and the Internet 114. In this example, the communication server system 112 includes a session and network manager 128 server 113, a headend server 127, and a network router 140. Moreover, the communication server system 112 can be local to the output device 120. The communication server system 112 is also interconnected to a premises or local network 110. In this example, the local network 110 can support communications between a user device 104, the Internet 114, and the communication server system 112. As can be appreciated by one of skill in the art after consideration of the present disclosure, other topologies are also possible for implementing embodiments of the present disclosure.

The user device 104 is connected to a wireless access point 109, for example via a WiFi connection 1412 made available through a service set identifier (SSID). In accordance with at least some embodiments of the present disclosure, the SSID is revealed to the user device 104 only after a pairing or other registration operation between the communication server system 112 or other authority and user device 104 has been completed. The server 113 can also allow the user device 104 to see an OTT device 162 (described below) only after the registration process has been completed. In addition, the server 113 can provide a personalized display to the user, for example through the user device 104, that includes information such as a list of casting services or apps that were used previously. The wireless access point 109 can be connected to the local network 110 through a wired (e.g. an Ethernet) connection.

In this example system, the local network 110 is connected to a connectivity or OTT device 162. More particularly, in this instance the OTT device 162 is a Chromecast device that is connected to the local network 110 by a Chromecast Ethernet and power adapter 137. Accordingly, in this example, the OTT device 162 network 1404 is an ethernet network. The OTT device 162 is in turn connected to the output device 120 (e.g. the guest room TV) by an HDMI connection. In an alternate configuration, the OTT device 162 can be connected to the output device 120 via an STB.

In operation, the user device 104 connects to the access point 109 using the SSID for the WiFi connection, and then pairs or registers with the server 113. Alternatively, the user device 104 can establish a connection with the communication server 112 via a cellular data connection. This registration process can be performed using a pairing app running on the user device 104. The user can then open a content provider app 106 on the user device 104. More particularly, the content provider app 106 can be one that supports casting content to an output device 120 associated with a device adaptor 160 that is external to the user device 104. In response to detecting the opening of the content provider app 106 with a content casting capability, the server 113 can provide an option to the user to connect to an output device 120 in the user's vicinity (e.g. in the same room as the access point 109) through a device adaptor 160 associated with the output device 120. This option can be presented in association with an identifier that is displayed on the output device 120, for example in the form of the user's room number, to provide assurance that the content will be provided to the correct output device 120.

Figure 15:
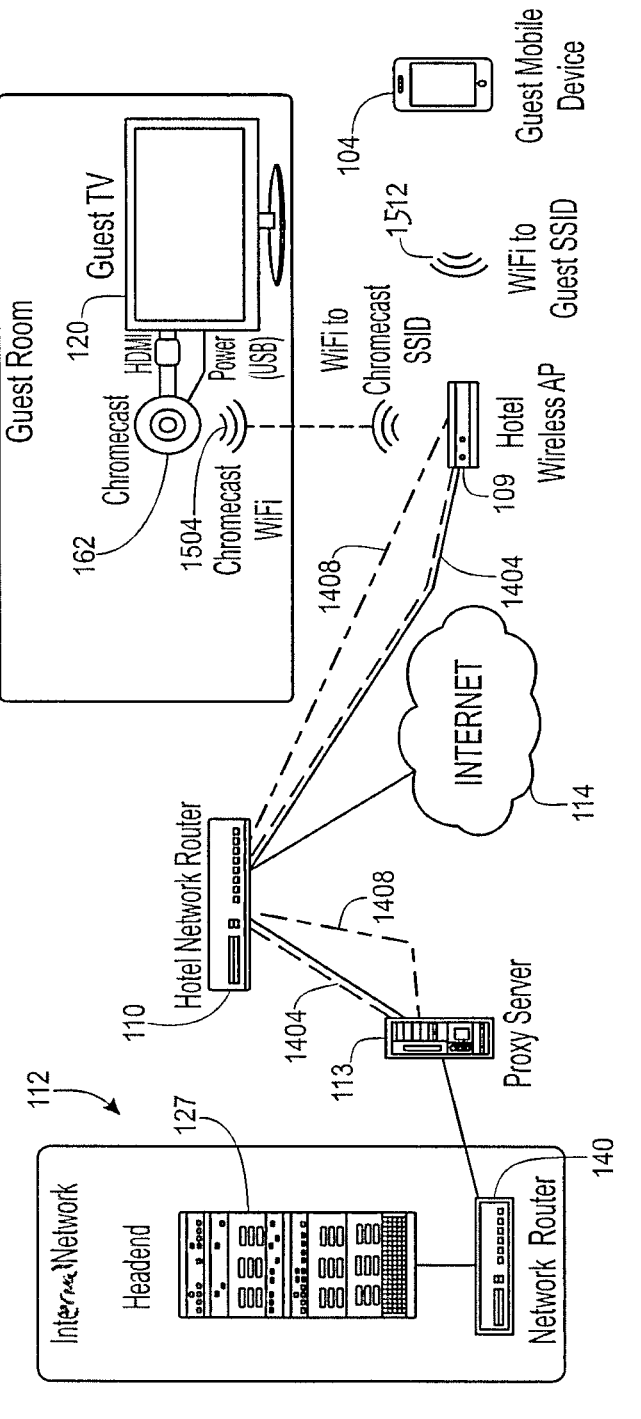
FIG. 15 depicts components of a system for selecting and delivering content in accordance with other embodiments of the present disclosure.

In FIG. 15 the components of a system for selecting and delivering content in accordance with other embodiments of the present disclosure that uses a wireless connection to an OTT device 162 are depicted. Accordingly, this configuration differs from the one depicted in FIG. 14 in that the OTT device 162 receives content over a wireless (e.g. a WiFi) connection 1504, rather than a wired connection. In addition, in this example the OTT device 162 receives power from the output device 120 directly, rather than through a separate adapter. The wireless connection to the OTT device 162 can employ a hidden SSID provided by the access point 109. A separate WiFi connection 1512, for example using a different SSID, is used by the user device 104 to connect to the access point 109.

Figure 16:
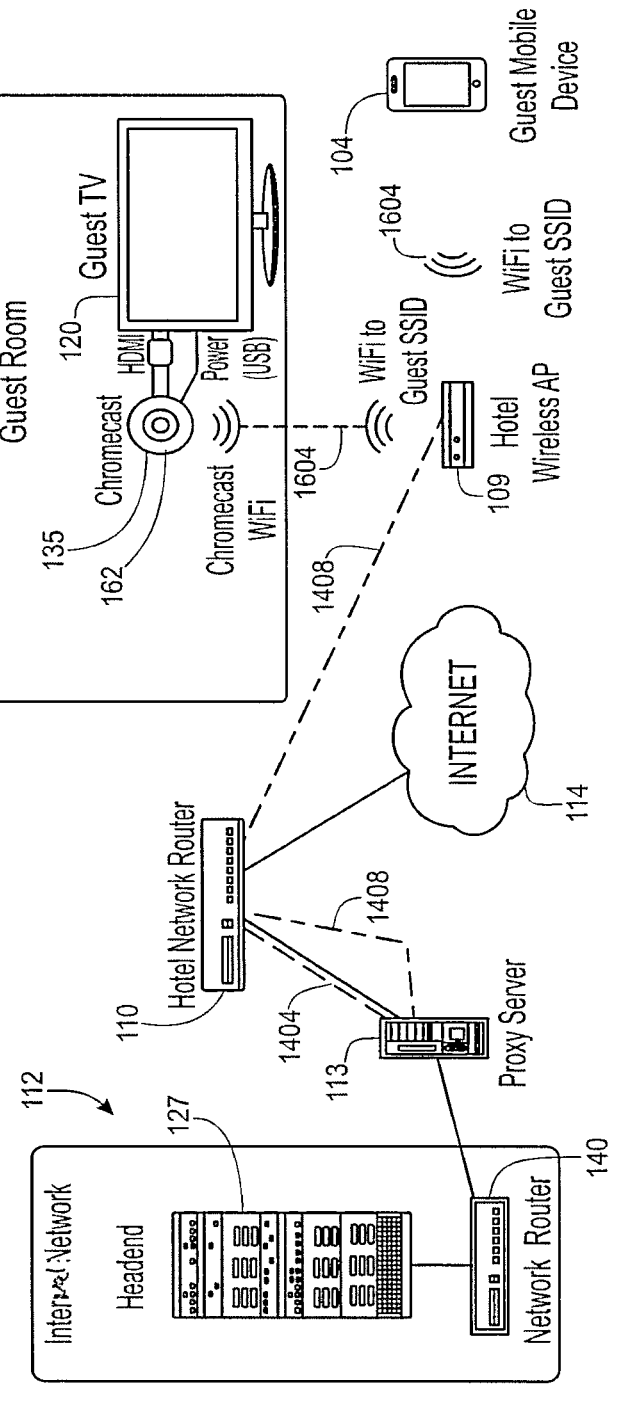
FIG. 16 depicts components of a system for selecting and delivering content in accordance with other embodiments of the present disclosure.

FIG. 16 illustrates a system that is similar to the one depicted in FIG. 15, except that the OTT device 162 uses the same wireless (e.g. WiFi) connection 1604 to the access point 109 as does the user device 104.

Figure 17:
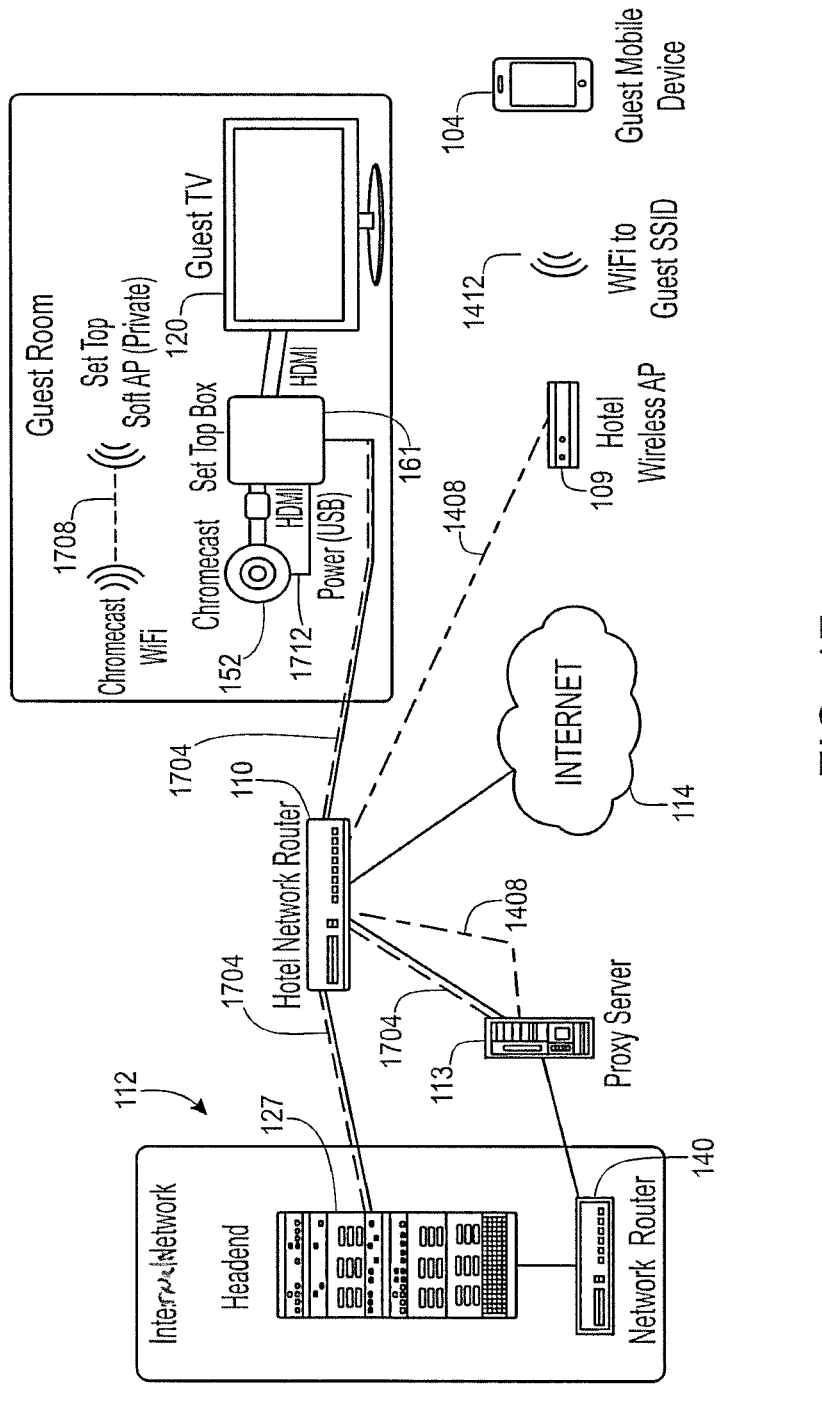
FIG. 17 depicts components of a system for selecting and delivering content in accordance with other embodiments of the present disclosure.

The embodiment of a system for selecting and delivering content depicted in FIG. 17 is similar to the system of FIG. 14, except that the user device 104 is connected to the access point 109 by a guest Wi-Fi connection 1412, and except that the OTT device 162 is connected to the output device 120 through a separate STB 161. More particularly, the STB 161 receives content over a wired connection 1704 to the local network 110. This content can be content that is ordered through the user device 104 after a connection between the user device and the local network 110 is established, and after the user device 104 has completed a registration process with the proxy server 113. The content is then delivered from the STB 161 to the OTT device 162 over a private wireless (e.g. WiFi) connection 1708. In addition, a wired power connection 1712 can be provided between the OTT device 162 and the set-top box 161. The OTT device 162 then outputs the content over an HDMI connection that is passed through the STB 161 to the output device 120. The STB 161 can also supply power to the OTT device 162.

Figure 18:
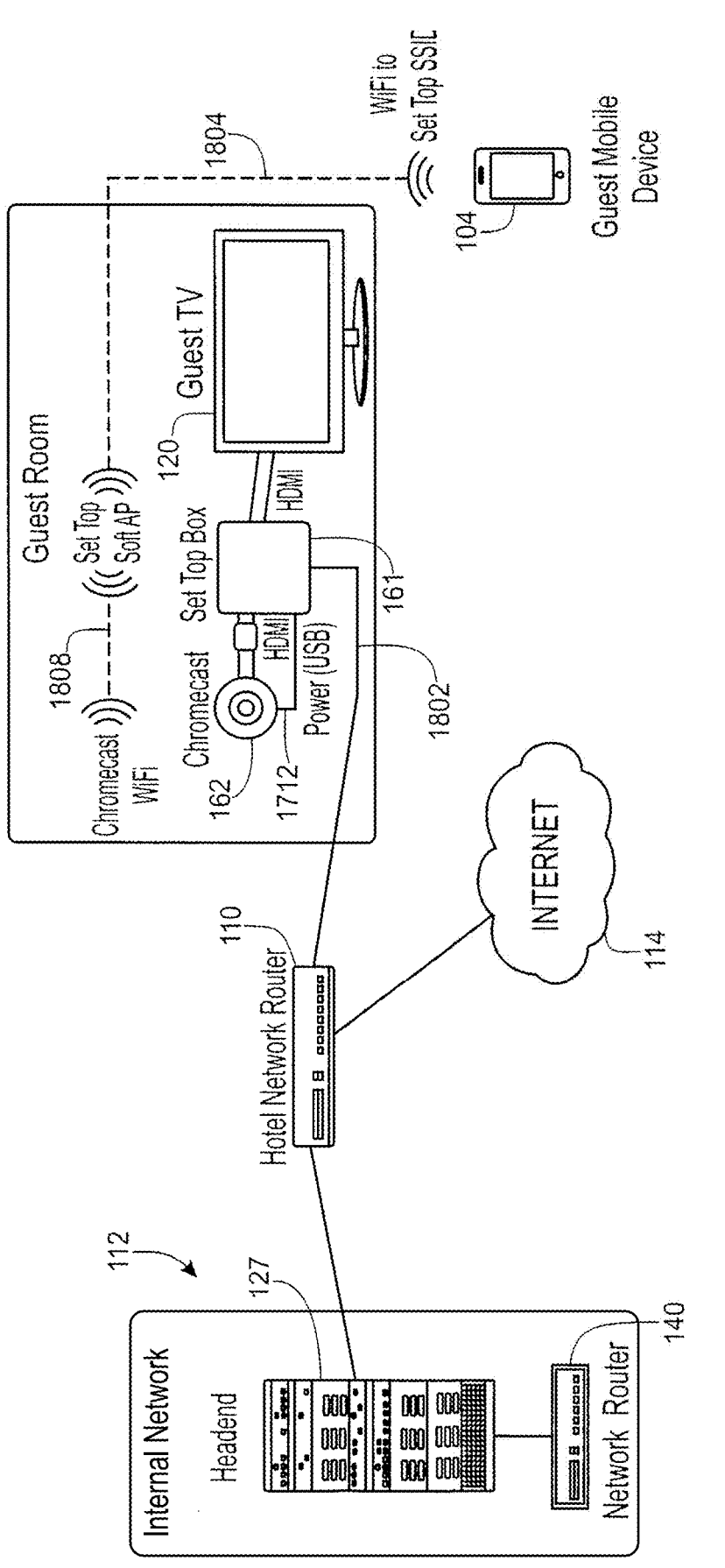
FIG. 18 depicts components of a system for selecting and delivering content in accordance with other embodiments of the present disclosure.

A system for selecting and delivering content in accordance with still another embodiment of the present disclosure is depicted in FIG. 18. In this embodiment, the wireless access point function is performed by the STB 161, which can be connected to the local network by a shared network connection 1802. Access by the user device 104 can be controlled by providing the wireless connection 1804 to the user device 104 through an SSID. The OTT device 162 can be connected to the set-top box 161 through a different Wi-Fi channel with a different SSID 1808, in addition to a wired power connection 1712. In particular, the STB 161 can function to provide a personal area network (PAN) that includes the OTT device 162, and the user device 104. In addition, the ability to directly content to the output device 120 can be enabled only after the user device 104 has completed a pairing or registration operation, for example with the headend server 127 or the STB 161. This ability to connect can be controlled by only providing the network name and/or password information needed to connect to the wireless access point (here the set-top box 161) after a registration or authorization process has been successfully completed. Accordingly, the possibility of sending content to an output device 120 located in another user's or guest's room can be eliminated. In various systems, including those illustrated in FIGS. 14-18, multiple communication servers 112 and/or proxy servers 113 can be provided. For example, different proxy servers 113 can be used in connection with the different user device 104 and OTT device 160 pairings for purposes of load balancing, supporting different areas or locations within a property, for providing different services, for supporting connections to different external content providers 124, or the like.

Figures 19A, 19B:
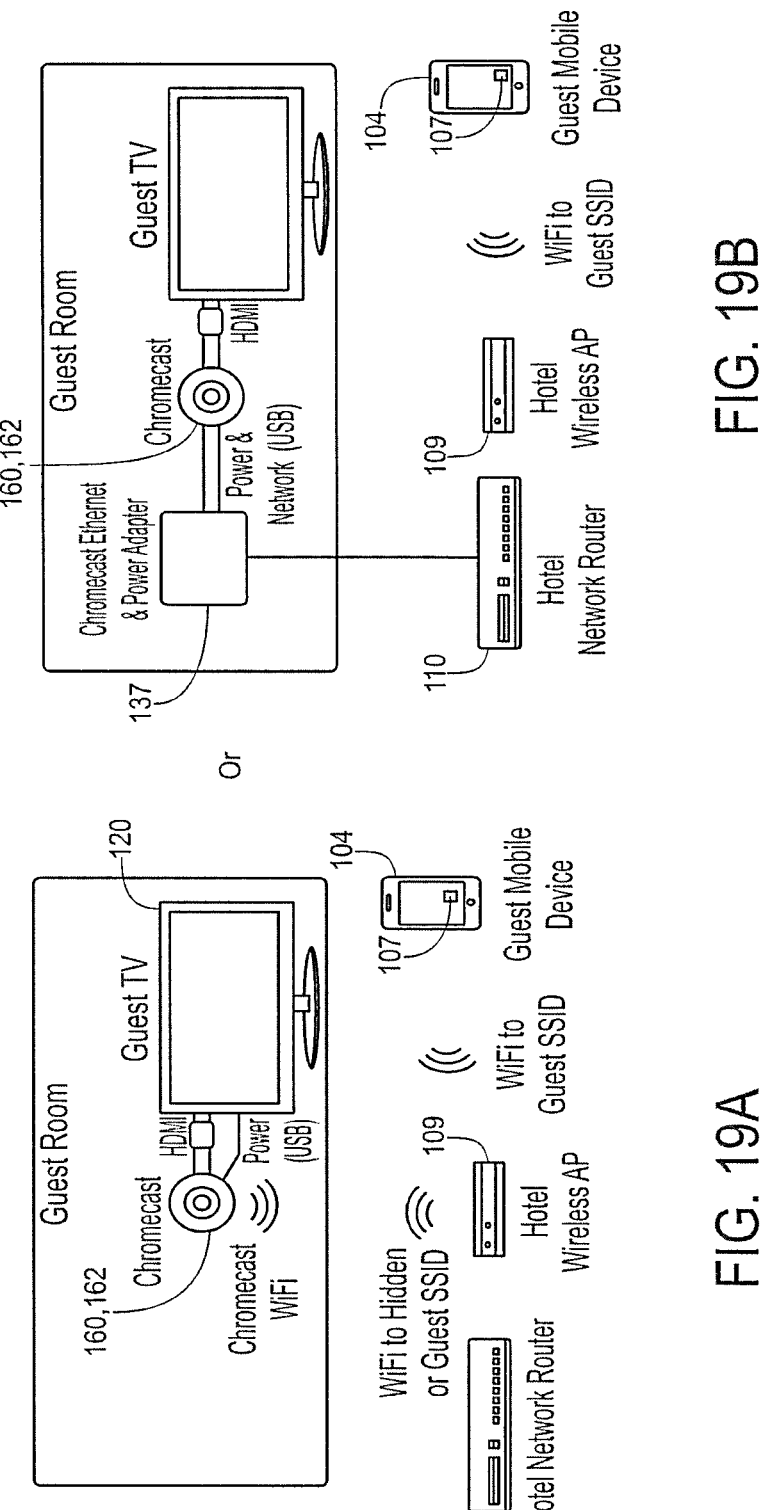
FIG. 19A depicts components of a system for selecting and delivering content in accordance with other embodiments of the present disclosure.
FIG. 19B depicts components of a system for selecting and delivering content in accordance with other embodiments of the present disclosure.

In accordance with still other embodiments, the user device 104 can connect to a communication server 112 or server 113 providing a session and network manager 128, and in turn to an OTT device 160, using an app 107 running on the user device 104. Moreover, the app can be personalized to the user 104 and/or the property with which the system is associated. For example, the app can present options to select and launch content provider apps (e.g., Netflix, Hulu or other apps) 106 that the user of the mobile device 104 subscribes to, commonly uses, or is otherwise associated with. Alternatively or in addition, the app 107 can present selected, e.g., sponsored, content provider apps to encourage selection of those apps by the user. The information that is presented can be controlled by operation of the p session and network manager 128, for example after a user device 104 has completed a registration or pairing process. In accordance with still other embodiments, the session and network manager 128 can control the content provider apps 106 that a user device 104 can use in connection with an OTT device 160 accessed through or in association with the session and network manager 128. In FIGS. 19A and 19B, embodiments of systems for selecting and delivering content using a device adaptor 160, such as an OTT device 162, operating in guest mode are depicted. In guest mode, the OTT device 162 can display a PIN on the output device 120. By opening an app 107 on the user device 104 that has detected the OTT device 162, which can be indicated to the user by a message such as "nearby Chromecast device detected", the user can enter the PIN and send (cast) content to the OTT device 162. Using guest mode, the OTT device 162 can be connected to an access point 109 through the guest WiFi, an SSID reserved for the OTT device 162, or through a wired connection to the local network 110. In addition, the user device 104 can be connected to the access point 109, or can be connected to the local network 110 by a carrier data connection to, for example, a headend server 127.

In accordance with at least some embodiments of the present invention, methods for connecting a user device 104, such as a smart phone or tablet device, to an output device 120, such as a television, on a multiple user wireless network, can include pairing or registering the user device 104 with a communication server 112 providing a session and network manager 128. Through pairing the user device 104 with an output device 120 in a particular room, the communication server 112 is informed of the room that the user device 104 is associated with. The communication server 112 can then allow the user device 104 to communicate with a device adaptor 160 that is associated with the output device 120 in the user's room while keeping device isolation in place so that no other user devices 104 can communicate with that device adaptor 160. Likewise, the user device 104 that has been placed in communication with the device adaptor 160 is prevented from communicating with any other device adaptor 160.

The communication server 112 can operate to enable discovery of and/or communication with a constrained set of OTT devices 162 to thereby enforce device isolation requirements. For example, the communication server 112 can operate to present a user device 104 that has paired with an output device 120 in a communication system 100, or that has otherwise registered with the communication server 112, with an option to connect to an output device 120 in the user's room through a device adaptor 160 connected to that output device 120. Accordingly, the set of device adaptors 160 presented to the user device 104 as being available can be limited to a single device adaptor 160. In accordance with other embodiments, for example where there is more than one type of device adaptor 160 available, or where there are different device adaptor 160 associated with different output devices 120 to which the user device 104 is given access, the set of available device adaptors 160 presented to the user can contain more than one device adaptor 160.

The association between an output device and a device adaptor 160 can be static or can be established dynamically. For instance, a static association is present where the output device 120 and the device adaptor 160 are both located in the user's room. A dynamic association is present where a device adaptor 160 is selected by the communication server from an array of device adaptors 160 and, as a result of that selection, is operatively connected to the output device 120 in the user's room.

In accordance with embodiments of the present disclosure, the different scenarios and network topologies illustrated herein can be implemented to operatively connect a user device 104 to a constrained set of output devices via a device adaptor 160. Moreover, process steps for advertising and discovery of device adaptor 160 and output device 120 pairs can be those described elsewhere herein, for example in connection with FIGS. 4, 6 and 8. In addition, various devices described herein can be integrated with other devices. For example, a device adaptor 160 function can be integrated into an output device 120 comprising a smartTV.

The contents of this disclosure may have the following configurations:

(1)

A system for selecting and delivering content, comprising:

a communication server;

a user device;

an access point;

a first network, wherein the access point and the communication server are connected to the first network, and wherein the user device is connected to the first network through the access point;

a plurality of device adaptors;

a second network, wherein the device adaptors are connected to the communication server through the second network, and wherein the communication server is operable to make at least one and less than all of the device adaptors visible to the user device; a plurality of output devices, wherein each device adaptor in the plurality of device adaptors is connected to at least one output device.

(2)

The system of (1), wherein the user device is operably connected to the at least one of the device adaptors by the communication server.

(3)

The system of (1) and (2), wherein the access point is a WiFi access point.

(4)

The system of any of (1) to (3), wherein the user device is connected to the access point using a first SSID.

(5)

The system of any of (1) to (4), wherein at least one of the device adaptors is connected to the access point using a second SSID.

(6)

The system of any of (1) to (5), wherein the at least one of the device adaptors is connected to the second network by a wireline connection.

(7)

The system of any of (1) to (6), wherein the user device is one of a smart phone, a tablet computer, and a laptop computer.

(8)

The system of any of (1) to (7), wherein the at least one of the device adaptors is a set top box.

(9)

The system of any of (1) to (8), wherein the at least one of the device adaptors is an over the top device.

(10)

The system of any of (1) to (9), wherein the device adaptors include over the top devices operating in conjunction with set top boxes.

(11)

The system of any of (1) to (10), wherein the output devices include televisions.

(12)

The system of any of (1) to (11), further comprising:

a plurality of user devices, wherein the communication server makes a first set of device adaptors visible to a first user device in the plurality of user devices, and wherein the communication server makes a second set of device adaptors visible to a second user device in the plurality of user devices.

(13)

The system of any of (1) to (12), wherein none of the device adaptors in the first set of device adaptors is included in the second set of device adaptors.

(14)

The system of any of (1) to (13), wherein the user device is operably connected to a device adaptor that is visible to the user device, wherein content is provided to the device adaptor that is operably connected to the user device, and wherein the content provided to the device adaptor is output by an output device operably connected to the device adaptor.

(15)

The system of any of (1) to (14), wherein the user device includes a content provider app, wherein content ordered through the content provider app is provided to the device adaptor that is visible to the user device.

(16)

A method, comprising:

providing a communication server;

providing a first access point, wherein the first access point is connected to the communication server by a first network;

providing a plurality of device adaptors, wherein the plurality of device adaptors include a first device adaptor, wherein the first device adaptor is operatively connected to the first access point through a second network;

providing a plurality of output devices, wherein each device adaptor is operatively connected to at least one output device included in the plurality of output devices;

receiving a request to pair a user device to an output device included in the plurality of output devices;

in response to the request, the communication server causing a response to be sent to the user device indicating the availability of at least a first output device included in the plurality of output devices;

receiving a request from the user device to output content using the first output device;

sending an acknowledgment to the request from the user device to output content from the first output device from the first device adaptor to the user device.

(17)

The method of (16), wherein the response sent to the user device indicating the availability of at least a first output device is received by a content provider app running on the user device.

(18)

The method of (16) or (17), wherein content is delivered to the first device adaptor from a content provider.

(19)

The method of any of (16) to (18), wherein the user device is in communication with the communication server and the first device adaptor using a first SSID, and wherein the first device adaptor is in communication with the communication server and the user device using a second SSID.

(20)

A system for selectively connecting user devices to output devices, comprising: a communication server;

a user device;

an access point, wherein the user device is connected to the access point through a first wireless connection;

a first network, wherein the access point and the communication server are connected to the first network, and wherein the user device is connected to the first network through the access point;

a plurality of over the top devices, wherein the communication server is operable to make a first over the top device included in the plurality of over the top devices visible to the user device, and wherein the first over the top device is connected to the access point through a second wireless connection; and a plurality of output devices, wherein each over the top device in the plurality of over the top devices is connected to at least one output device.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A system for selecting and delivering content, comprising:

a first network;

a communication server;

a first user device; and a plurality of output devices, wherein, in response to the first user device establishing a connection with the communication server via the first network, an identification of a first sub-set of output devices in the plurality of output devices determined by the communication server to be available for use by the first user device is communicated by the communication server to the first user device via the first network, wherein a content provider application launched on the first user device receives a message identifying the first sub-set of output devices available for use by the first user device and the first content provider application presents an option to display content on an output device included in the first sub-set of output devices, and wherein, in response to receiving a selection from a user to output content on a first output device included in the first sub-set of output devices, content is delivered from a content provider to the first output device without passing through the first user device.

2. The system of claim 1, further comprising:

a second user device, wherein, in response to the second user device establishing a connection with the communication server via the first network, an identification of a second sub-set of the output devices in the plurality of output devices determined by the communication server to be available for use by the second user device is communicated by the communication server to the second user device via the first network.

3. The system of claim 2, further comprising:

a first content provider, wherein first content held by the first content provider and accessed using credentials associated with the first user device is delivered to a selected output device included in the first sub-set of output devices using a second network.

4. The system of claim 3, wherein second content held by the first content provider and accessed using credentials associated with the second user device is delivered to a selected output device included in the second sub-set of output devices using the second network.

5. The system of claim 3, further comprising:

a second content provider, wherein second content held by the second content provider and accessed using credentials associated with the second user device is delivered to a selected output device included in the second sub-set of output devices using the second network.

6. The system of claim 1, wherein the first sub-set of output devices is determined based on credentials of the first user device.

7. The system of claim 6, wherein the credentials of the first user device include a room number associated with the first user device.

8. The system of claim 3, wherein the first content is output by the selected output device.

9. The system of claim 8, wherein the first content is not passed through the first user device.

10. The system of claim 8, wherein the first content is provided to the selected output device by the first network and a first device adaptor.

11. The system of claim 10, wherein the first device adaptor is connected to the first user device through the communication server.

12. The system of claim 4, wherein the first content is output by the selected output device included in the first sub-set of output devices, wherein the first content is provided to the selected output device included in the first sub-set of output devices by the second network and a first device adaptor, wherein the second content is output by the selected output device included in the second sub-set of output devices, and wherein the second content is provided to the selected output device included in the second sub-set of output devices by the second network and a second device adaptor.

13. The system of claim 1, wherein the first user device is one of a cellular telephone or a personal computer.

14. A system for selecting and delivering content, comprising:

a first network, the first network including:

a communication server; and a first access point;

a second network, the second network including:

at least a first output device; and at least a first sub-set of user devices;

wherein the first sub-set of user devices is registered with the communication server, wherein, in response to the first user device registering with the communication server, the communication server identifies the first sub-set of user devices as being available to the first user device, wherein, following the first user device connecting to the first access point, a first content provider application is launched on the first user device and the first content provider application presents an option to display content on at least one output device included in the first sub-set of output devices, wherein, in response to a user selection of a first output device included in the first sub-set of user devices to output content using the first output device that is entered using the first content provider application on the first user device, the content is delivered from a content provider to the first output device without passing through the first user device.

15. The system of claim 14, further comprising:

a second user device, wherein the second user device is registered with the communication server and associated with second information, and wherein the first output device is not visible to the second user device.

16. The system of claim 15, wherein the first access point is a WiFi access point.

17. The system of claim 16, wherein the first user device is connected to the first access point using a first SSID.

18. The system of claim 17, wherein the second user device is connected to the first access point using a second SSID.

19. The system of claim 14, wherein first information associated with the first user device includes an identifier of a particular room in a hospitality establishment, and wherein the first user device is paired with the first output device in the particular room of the hospitality establishment.

20. A method, comprising:

registering a first user device with a communication server, wherein the first user device is associated with first information;

connecting the first user device to a first access point;

in response to the first user device connecting to the first access point, the communication server identifying a first sub-set of output devices available to the first user device; and receiving a user selection to output content from a content provider through a first output device included in the first sub-set of output devices through a first content provider application on the first user device;

outputting content from the content provider on the first output device, wherein the content from the content provider does not pass through the first user device, and wherein the first output device is not visible to a second
   user device.

* * * * *